US012706658B2

(12) United States Patent
He

(10) Patent No.: US 12,706,658 B2
(45) Date of Patent: Aug. 11, 2026

(54) CRITERIA AND PROCEDURES FOR RLM/BFD RELAXATION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/369,881

(22) Filed: Jul. 7, 2021

(65) Prior Publication Data

US 2023/0019889 A1 Jan. 19, 2023

(51) Int. Cl.

| | |
|---|---|
| ***H04B 7/06*** | (2006.01) |
| ***H04B 17/318*** | (2015.01) |
| ***H04L 5/00*** | (2006.01) |
| ***H04W 24/08*** | (2009.01) |
| ***H04W 24/10*** | (2009.01) |
| ***H04W 52/02*** | (2009.01) |

(52) U.S. Cl.

CPC ...... *H04W 52/0258* (2013.01); *H04B 17/328* (2023.05); *H04L 5/0051* (2013.01); *H04W 24/08* (2013.01); *H04W 24/10* (2013.01)

(58) Field of Classification Search

CPC .. H04B 7/0695; H04B 17/309; H04B 17/318; H04B 17/382; H04L 5/0051; H04W 24/08; H04W 24/10; H04W 36/0094; H04W 24/02; H04W 52/0216; H04W 52/0258; H04W 52/0232; H04W 52/0219; H04W 36/0088; Y02D 30/70

See application file for complete search history.

(56) References Cited

U.S. PATENT DOCUMENTS

| | | | | |
|---|---|---|---|---|
| 2015/0092566 | A1 | 4/2015 | Balachandran et al. | |
| 2016/0142926 | A1 * | 5/2016 | Yiu | H04W 24/08 370/280 |
| 2017/0048772 | A1 * | 2/2017 | Gheorghiu | H04L 5/0007 |
| 2018/0217245 | A1 * | 8/2018 | Riess | G01S 11/10 |
| 2018/0255489 | A1 * | 9/2018 | Xu | H04W 36/00 |
| 2020/0288479 | A1 * | 9/2020 | Xi | H04W 76/27 |
| 2020/0383029 | A1 * | 12/2020 | Takeda | H04W 36/00837 |
| 2021/0105643 | A1 * | 4/2021 | Kim | H04W 52/0209 |
| 2021/0194756 | A1 * | 6/2021 | Babaei | H04B 7/088 |
| 2022/0061116 | A1 * | 2/2022 | Lim | H04W 76/19 |

(Continued)

FOREIGN PATENT DOCUMENTS

WO WO-2021078235 A1 * 4/2021 ........... H04W 24/02

OTHER PUBLICATIONS

3GPP TSG RAN meeting #92-e Electronic Meeting, Jun. 14-18, 2021 (RP-211452) (Year: 2021).*

(Continued)

*Primary Examiner* — Sun Jong Kim

(74) *Attorney, Agent, or Firm* — Procopio, Cory, Hargreaves & Savitch LLP/QUALCOMM Incorporated

(57) ABSTRACT

Apparatus and method for wireless communications that include RLM or BFD procedures. The apparatus measures one or more reference signals for an RLM procedure or a BFD procedure. The apparatus reduces a rate of the measuring the one or more reference signals for the RLM procedure or the BFD procedure based at least in part on at least one measurement of the one or more reference signals meeting a relaxation criteria.

53 Claims, 11 Drawing Sheets

(56) References Cited

U.S. PATENT DOCUMENTS

| | | | | |
|---|---|---|---|---|
| 2022/0070706 | A1* | 3/2022 | Kusashima | H04W 48/20 |
| 2022/0095309 | A1* | 3/2022 | MolavianJazi | H04W 56/001 |
| 2022/0167202 | A1* | 5/2022 | Su | H04W 24/10 |
| 2022/0201531 | A1* | 6/2022 | Huang | H04W 4/025 |
| 2022/0231883 | A1* | 7/2022 | Chou | H04B 7/088 |
| 2022/0248244 | A1* | 8/2022 | Chen | H04W 24/08 |
| 2022/0330066 | A1* | 10/2022 | Raghavan | H04W 56/001 |
| 2023/0171656 | A1* | 6/2023 | Zhang | H04W 36/0085 370/331 |
| 2023/0328830 | A1* | 10/2023 | Yi | H04W 76/19 370/329 |

OTHER PUBLICATIONS

3GPP TS 38.304: "3rd Generation Partnership Project, Technical Specification Group Radio Access Network, NR, User Equipment (UE) procedures in Idle mode and RRC Inactive state (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V16.5.0, Jul. 6, 2021, pp. 1-39, XP052030213, section 5.2.4.2, 5.2.4.9.2.

3GPP TS 38.306, "3rd Generation Partnership Project; Technical Specification Group Radio Access Network; NR; User Equipment (UE) Radio Access Capabilities (Release 16)", 3GPP TS 38.306, V16.8.0, Mar. 2022, pp. 1-138, Section 5.6.

International Search Report and Written Opinion—PCT/US2022/032775—ISA/EPO—Sep. 21, 2022.

Mediatek Inc: "UE Power Saving Enhancements for NR", 3GPP TSG RAN meeting #92-e, RP-211452, 3rd Generation Partnership Project, Mobile Competence Centre, 650, Route Des Lucioles, F-06921 Sophia-Antipolis Cedex, France, vol. TSG RAN, No. Electronic Meeting, Jun. 14-Jun. 18, 2021, Jun. 7, 2021, 26 Pages, XP052025550, Section 2.4.1, p. 15-p. 20.

3GPP TS 38.133: "3rd Generation Partnership Project, Technical Specification Group Radio Access Network, NR, Requirements for Support of Radio Resource Management (Release 16)", 3GPP TS 38.133, V16.12.0, Jun. 2022, 3303 pages.

3GPP TS 38.300: "3rd Generation Partnership Project, Technical Specification Group Radio Access Network, NR, NR and NG-RAN Overall Description, Stage 2 (Release 16)", 3GPP TS 38.300 V16.6.0, Jun. 2021, pp. 1-152, Section 7.9.

3GPP TS 38.304: "3rd Generation Partnership Project, Technical Specification Group Radio Access Network, NR, User Equipment (UE) Procedures in Idle Mode and RRC Inactive State (Release 16)", 3GPP TS 38.304 V16.5.0, Jun. 2021, pp. 1-39, Section 5.2.4.9.

3GPP TS 38.331: "3rd Generation Partnership Project, Technical Specification Group Radio Access Network, NR, Radio Resource Control (RRC) Protocol Specification (Release 16)", 3GPP TS 38.331 V16.5.0, Jun. 2021, pp. 1-959, Section 5.7.

* cited by examiner

One Frame (TDD)
10 ms
200
subframe
RB
slot
D D D D D D D D D D D D F U
subcarrier
R
OFDM symbol
slot
DMRS R
CSI-RS 230
PDCCH CORESET
SSS
PSS
PDSCH
PBCH
REG 12 REs
1 CCE = 6 REGs
SS/PBCH Block
BWP
20 RBs
channel bandwidth RBs 250
U U U U U U U U U U U U U U
SRS
SRS Comb 0
SRS Comb 1

280
PUCCH
PUSCH

CRITERIA AND PROCEDURES FOR RLM/BFD RELAXATION

INTRODUCTION

The present disclosure relates generally to communication systems, and more particularly, to wireless communications that include radio link monitoring (RLM) or beam failure detection (BFD) procedures.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for wireless communication is provided. The apparatus is configured to measure one or more reference signals for a radio link monitoring (RLM) procedure or a beam failure detection (BFD) procedure. The apparatus is configured to reduce a rate of the measuring the one or more reference signals for the RLM procedure or the BFD procedure based at least in part on at least one measurement of the one or more reference signals meeting a relaxation criteria.

In another aspect, a method of wireless communication is provided. The method comprises measuring one or more reference signals for an RLM procedure or a BFD procedure, and reducing a rate of the measuring the one or more reference signals for the RLM procedure or the BFD procedure based at least in part on at least one measurement of the one or more reference signals meeting a relaxation criteria.

In another aspect, an apparatus for wireless communication is provided. The apparatus comprises means for measuring one or more reference signals for an RLM procedure or a BFD procedure, and means for reducing a rate of the measuring the one or more reference signals for the RLM procedure or the BFD procedure based at least in part on at least one measurement of the one or more reference signals meeting a relaxation criteria.

In another aspect, a computer-readable medium storing computer executable code for wireless communication is provided. The code when executed by a processor causes the processor to measure one or more reference signals for an RLM procedure or a BFD procedure, and reduce a rate of the measuring the one or more reference signals for the RLM procedure or the BFD procedure based at least in part on at least one measurement of the one or more reference signals meeting a relaxation criteria.

In an aspect of the disclosure, an apparatus for wireless communication is provided. The apparatus is configured to transmit, to a user equipment (UE), a one or more reference signals for a radio link monitoring (RLM) procedure or a beam failure detection (BFD) procedure. The apparatus is configured to transmit, to the UE, a relaxation configuration configuring the UE to reduce a rate of measuring the one or more reference signals for the RLM procedure or the BFD procedure in response to at least one measurement, by the UE, of the one or more reference signals meeting a relaxation criteria.

In another aspect, a method of wireless communication is provided. The method comprises transmitting, to a user equipment (UE), a one or more reference signals for an RLM procedure or a BFD procedure, and transmitting, to the UE, a relaxation configuration configuring the UE to reduce a rate of measuring the one or more reference signals for the RLM procedure or the BFD procedure in response to at least one measurement, by the UE, of the one or more reference signals meeting a relaxation criteria.

In another aspect, an apparatus for wireless communication is provided. The apparatus comprises means for transmitting, to a user equipment (UE), a one or more reference signals for an RLM procedure or a BFD procedure, and means for transmitting, to the UE, a relaxation configuration configuring the UE to reduce a rate of measuring the one or more reference signals for the RLM procedure or the BFD procedure in response to at least one measurement, by the UE, of the one or more reference signals meeting a relaxation criteria.

In another aspect, a computer-readable medium storing computer executable code for wireless communication is provided. The code when executed by a processor causes the processor to transmit, to a UE, a one or more reference signals for an RLM procedure or a BFD procedure, and transmit, to the UE, a relaxation configuration configuring the UE to reduce a rate of measuring the one or more reference signals for the RLM procedure or the BFD procedure in response to at least one measurement, by the UE, of the one or more reference signals meeting a relaxation criteria.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
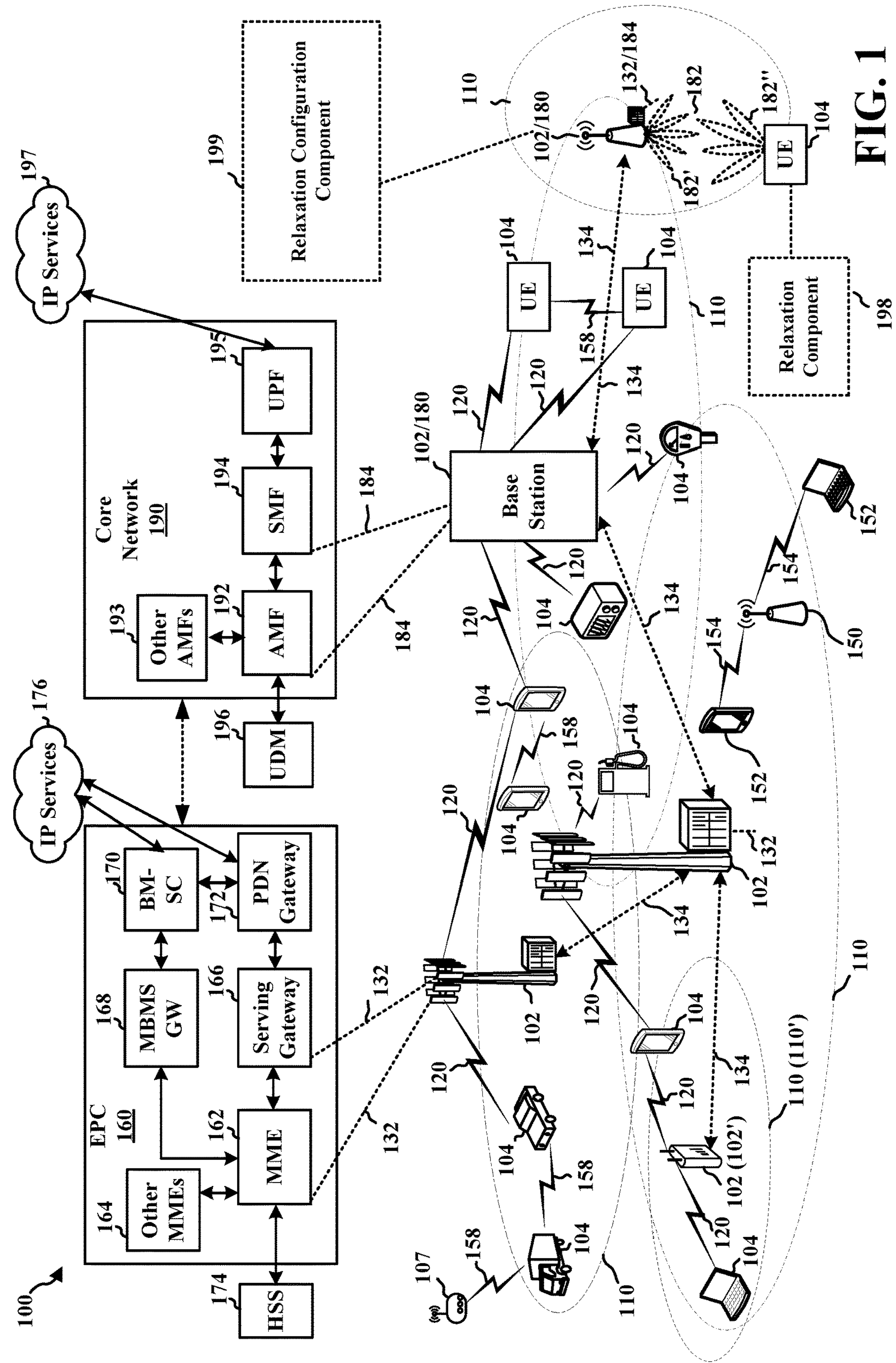
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

A UE may monitor the quality of the beams that it uses for communication with a base station. A beam failure detection (BFD) procedure may be used to identify problems in beam quality and a radio link monitoring (RLM) procedure may be used when a beam failure is detected. For monitoring active link performances, a UE may perform at least one measurement of at least one signal, e.g., reference signal(s) (RS), for beam failure detection. A UE may be configured by a base station for DRX. During an RRC connected state, when there is no data transmission in either direction (UL/DL), the UE transitions to the DRX mode in which the UE discontinuously monitors the PDCCH channel, using a sleep and wake cycle, which may save battery power.

While DRX provides battery savings for a UE, DRX may present challenges for a UE performing RLM/BFD procedures. As such, presented herein is a configuration to configure a UE to relax RLM/BFD measurements to reduce power consumption at the UE when certain criteria are met. For example, the UE may be configured with a relaxation configuration that configures the UE to reduce a rate of measuring reference signals for RLM/BFD procedures. The UE may enter a relaxation procedure, where the UE reduces the rate of measuring reference signals (e.g., channel state information reference signals (CSI-RS), Reference Signal Received Power (RSRP), a synchronization signal (SS)/Physical Broadcast Channel (PBCH) block, also referred to as SS block (SSB)) for RLM/BFD procedures, based at least in part on the at least one measurement of the one or more reference signals meeting a relaxation criteria. At least one advantage of the disclosure is that when the UE enters the relaxation procedure, the UE may reduce the rate at which the UE measures reference signals for RLM/BFD procedures, which reduces power consumption at the UE. In addition, the UE may experience a prolonged battery-life due in part to entering the relaxation procedure.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 602.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to reduce a rate of measuring reference signals for RLM or BFD based on a relaxation configuration. For example, the UE 104 may comprise a relaxation component 198 configured to reduce a rate of measuring reference signals for RLM or BFD based on a relaxation configuration. The UE 104 measures one or more reference signals for an RLM procedure or a BFD procedure. The UE 104 reduces a rate of the measuring the one or more reference signals for the RLM procedure or the BFD procedure based at least in part on at least one measurement of the one or more reference signals meeting a relaxation criteria.

Referring again to FIG. 1, in certain aspects, the base station 180 may be configured to provide a UE 104 with a relaxation configuration configuring the UE to reduce a rate of measuring reference signals for RLM or BFD. For example, the base station 180 may comprise a relaxation component 199 configured to provide the UE 104 with a relaxation configuration configuring the UE to reduce a rate of measuring reference signals for RLM or BFD. The base station 180 transmits, to a UE 104, one or more reference signals for an RLM procedure or a BFD procedure. The base station 180 transmits, to the UE, a relaxation configuration configuring the UE to reduce a rate of measuring the one or more reference signals for the RLM procedure or the BFD procedure in response to at least one measurement, by the UE, of the one or more reference signals meeting a relaxation criteria.

Although the following description may be focused on 5G NR, the concepts described herein may be applicable to other similar areas, such as LTE, LTE-A, CDMA, GSM, and other wireless technologies.

Figures 2A, 2B, 2C, 2D:
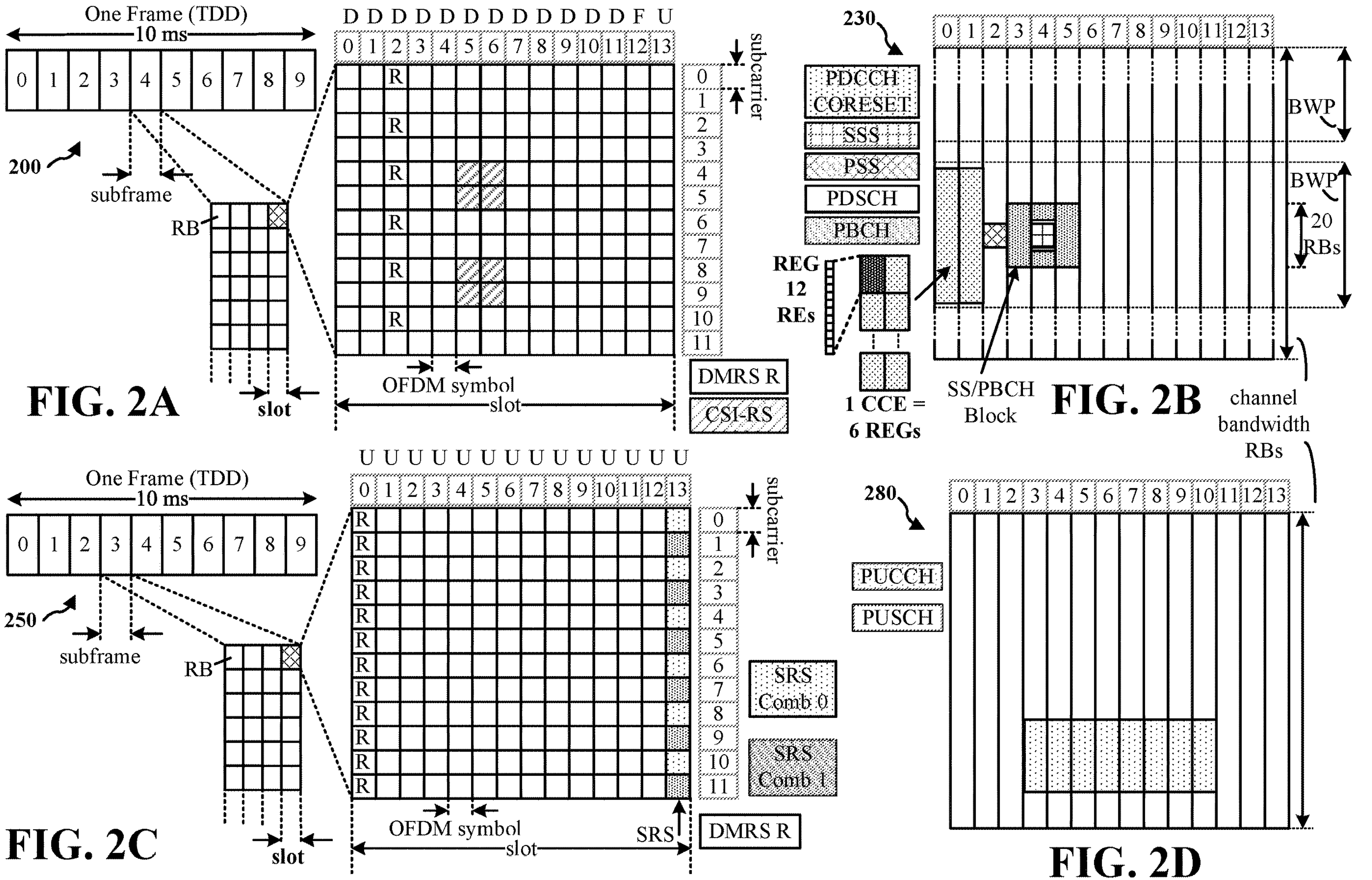
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
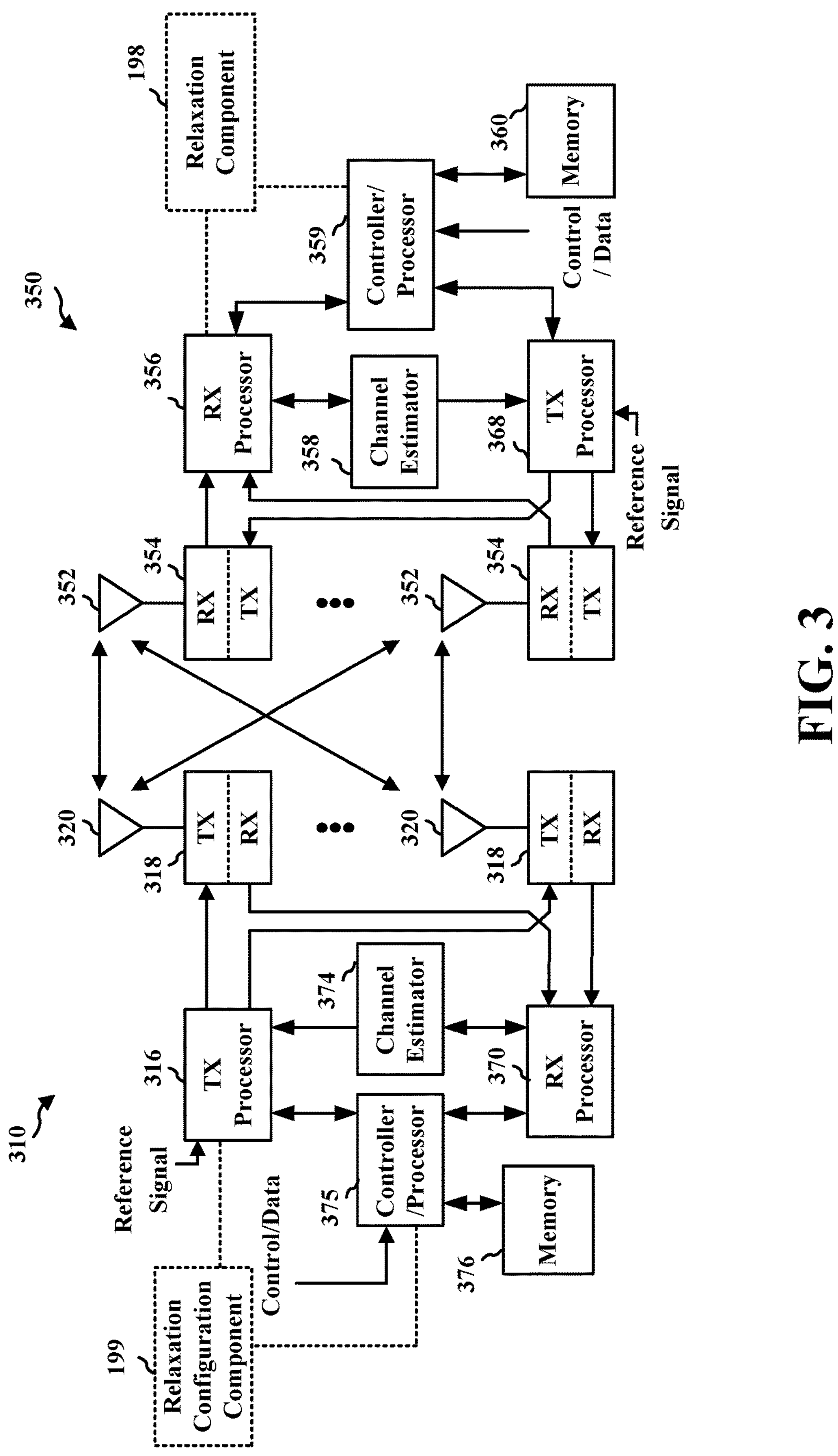
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

A UE may monitor the quality of the beams that it uses for communication with a base station. For example, a UE may monitor a quality of a signal received via reception beam(s). A beam failure detection (BFD) procedure 408 may be used to identify problems in beam quality and a radio link monitoring (RLM) procedure may be used when a beam failure is detected 409. The BFD procedure may indicate 411 whether a link for a particular beam is in-sync or out-of-sync. For monitoring active link performances, a UE may perform at least one measurement 408 of at least one signal, e.g., reference signal(s) (RS) 406, for beam failure detection. The at least one measurement may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, PBCH, SS, or other reference signals for time and/or frequency tracking, etc. The UE may receive an indication of reference signal resources to be used to measure beam quality in connection with BFD. The UE may monitor the reference signal(s) and determine the signal quality, e.g., Reference Signal Received Power (RSRP) for the reference signal. In some cases, the UE may determine a configured metric such as block error rate (BLER) for a reference signal. The measurement(s) may indicate the UE's ability to decode a transmission, e.g., a DL control transmission from the base station.

Thresholds may be defined in tracking the radio link conditions, the threshold(s) may correspond to an RSRP, a BLER, etc. that indicates an in-sync condition and/or an out-of-sync condition of the radio link. An "out-of-sync" condition may indicate that the radio link condition is poor, and an "in-sync" condition may indicate that the radio link condition is acceptable, and the UE is likely to receive a transmission transmitted on the radio link. An Out-of-Sync condition may be declared when a block error rate for the radio link falls below a threshold over a specified time interval, e.g., a 200 ms time interval. An in-sync condition may be declared when a block error rate for the radio link is better than a threshold over a second, specified time interval, e.g., over 100 ms time interval. The thresholds and time intervals used to determine the in-sync condition and out-of-sync condition may be the same or may be different from each other. If the UE receives a threshold number of out-of-sync measurements over a period of time, the UE may declare a beam failure.

When a beam failure is detected 409, a UE may take appropriate actions to recover the connection. For example, after M RLM failure indications out of the last N measurement instances, the UE may trigger a radio link failure procedure to initiate recovery of the connection with the base station. For example, the UE may be configured by RRC with a beam failure recovery procedure that is used to indicate 411 to the base station that the beam failure has been detected 409. The base station and UE may communicate over active data/control beams both for DL communication and UL communication. The base station and/or UE may switch to a new beam direction using beam failure recovery procedures.

A UE may be configured by a base station for discontinuous reception (DRX). During an RRC connected state, when there is no data transmission in either direction (UL/DL), the UE transitions to the DRX mode in which the UE discontinuously monitors the PDCCH channel, using a sleep and wake cycle. Without DRX, the UE monitors PDCCH in every subframe to check whether there is downlink data available for the UE. Monitoring of the PDCCH drains the UE's battery power. In a DRX mode, when the UE is in a sleep portion of the cycle, the UE does not monitor for PDCCH, which may save battery power. The DRX configuration for a UE may be configured by the network in RRC signaling from a base station, e.g. in an RRC Connection Setup request or an RRC connection reconfiguration request.

A DRX configuration 1100 may include the configuration of any of a number of timers and values, e.g., any of an ON duration Timer, a DRX Inactivity Timer, a DRX Retransmission Timer, a DRX UL Retransmission Timer, drx-HARQ-RTT-TimerDL, drx-HARQ-RTT-TimerUL, a long DRX Cycle, a value of the DRX Start Offset, drx-LongCycleStartOffset, a DRX Short Cycle Timer, a short DRX Cycle, drx-SlotOffset, etc. A DRX Cycle 1106 may comprise a periodic repetition of ON Duration 1102 in which the UE monitors PDCCH and an OFF Duration 1104, which may be referred to as a DRX opportunity. During the OFF duration, the UE does not monitor for PDCCH. The UE may enter a sleep mode or low power mode in which the UE minimizes power consumption by shutting down a radio frequency (RF) function without detecting communication from the base station.

The DRX Inactivity Timer gives a time, e.g., in terms of TTI duration, after the UE successfully decodes PDCCH before the UE may again enter the OFF Duration. The On Duration Timer may give the number of consecutive PDCCH subframe(s) that need to be monitored/decoded when the UE wakes up from the OFF duration in DRX Cycle. The DRX Retransmission Timer may give a consecutive number of PDCCH subframe(s) for the UE to monitor when a retransmission is expected by the UE. A DRX short cycle may correspond to a first DRX cycle that the UE enters after successful expiration of DRX inactivity timer. The UE may be in the short DRX cycle until the expiration of DRX short cycle timer. After that, the UE may enter a Long DRX cycle. A DRX Short Cycle Timer may be a parameter that gives a number of consecutive subframe(s) that the UE shall follow the short DRX cycle after the DRX Inactivity Timer has expired.

Thus, after a successful attempt of DL data, a DRX Inactivity Timer may be started for a number of subframes. If there is any UL or DL data transmission during DRX Inactivity Timer the timer restarts again. If DRX Inactivity Timer expires without UL/DL activity, the UE may enter the DRX cycle to achieve power savings. The UE may start with a Short DRX Cycle. If a short cycle timer expires, the UE may enter a longer DRX cycle. The UE may further be able to transition to an idle mode DRX based on an RRC inactivity timer.

While DRX provides battery savings for a UE, DRX may present challenges for a UE performing RLM/BFD procedures. A periodicity of measuring radio link quality measurements may be set to be the maximum between the shortest periodicity of reference signals in a set $q_0$ and the length of the DRX cycle for the UE. Under such guidelines, if the DRX period is longer than the shortest periodicity of the configured reference signals, then it is possible that there are multiple instances of reference signals between two DRX on durations. If the beam failure indication period is a maximum between the shortest periodicity of RSs used to assess the radio link quality, the UE would have to wake up multiple times during DRX off duration to perform BFD. Such behavior reduces the power savings provided by DRX, especially when a beam failure indication period is short and the DRX cycle of the UE is long.

Aspects presented herein provide a configuration to configure a UE to relax RLM/BFD measurements to reduce power consumption at the UE when certain criteria are met. For example, the base station may provide the UE with a relaxation configuration that configures the UE to reduce a rate of measuring reference signals for RLM/BFD procedures. The UE may enter a relaxation procedure, where the UE reduces the rate of measuring reference signals for RLM/BFD procedures, based at least in part on the at least one measurement of the one or more reference signals meeting a relaxation criteria.

Figure 4:
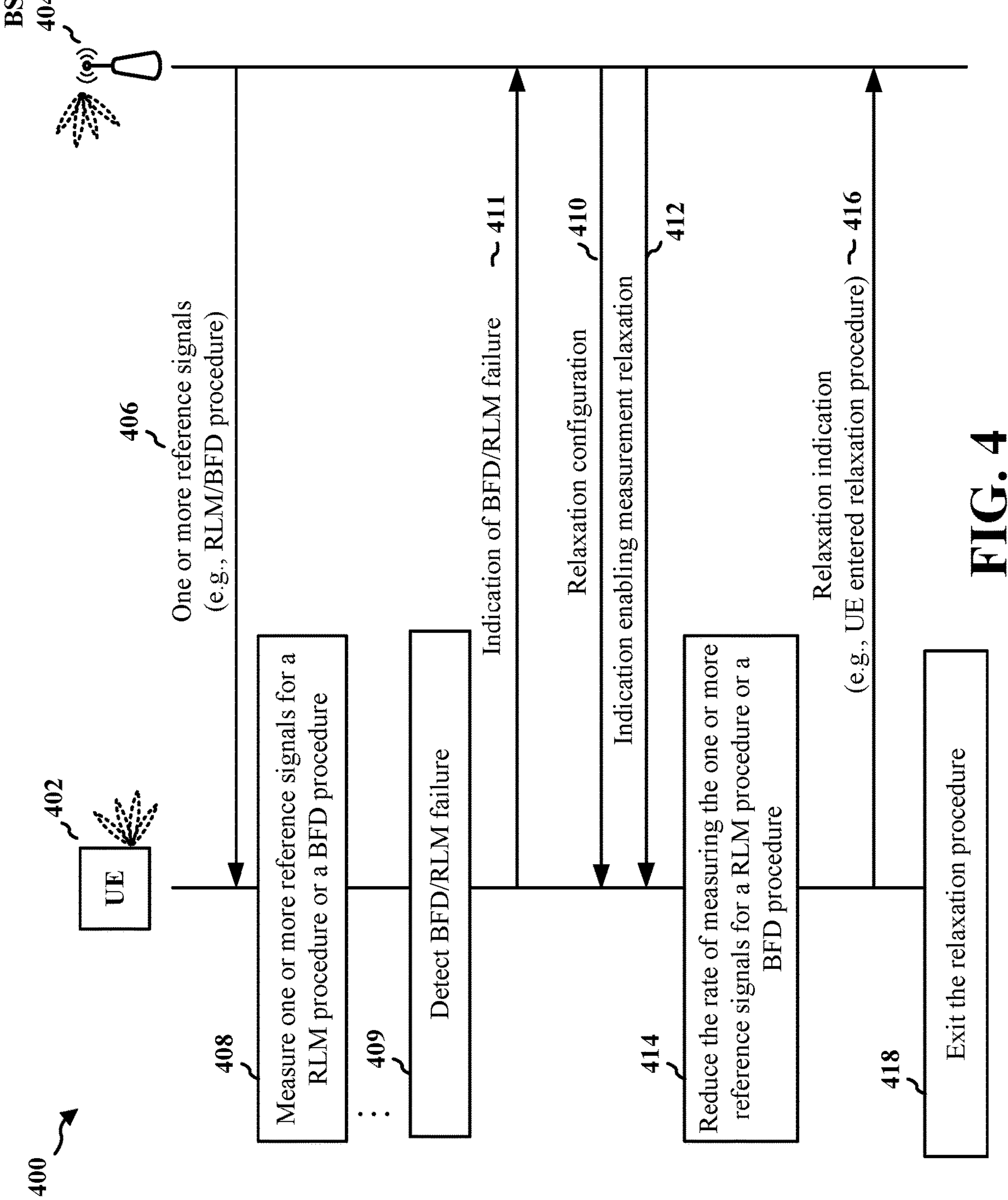
FIG. 4 is a call flow diagram of signaling between a UE and a base station.

FIG. 4 is a call flow diagram 400 of signaling between a UE 402 and a base station 404. The base station 404 may be configured to provide at least one cell. The UE 402 may be configured to communicate with the base station 404. For example, in the context of FIG. 1, the base station 404 may correspond to base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350. One or more of the illustrated operations may be omitted, transposed, or contemporaneous.

As illustrated at 406, the base station 404 may transmit one or more reference signals for an RLM procedure or a BFD procedure. The base station 404 may transmit the one or more reference signals for the RLM procedure or the BFD procedure to the UE 402.

As illustrated at 408, the UE 402 may measure the one or more reference signals for an RLM procedure or a BFD procedure. The UE 402 may measure the one or more reference signals for the RLM procedure or the BFD procedure received from the base station 404.

As illustrated at 409, the UE 402 may detect a BFD or RLM failure. The UE 402 may detect the BFD or RLM failure based on the measurement of the one or more reference signals from the base station 404.

As illustrated at 411, the UE 402 may transmit an indication of a BFD or RLM failure. The UE 402 may transmit the indication of the BFD or RLM failure to the base station 404. The UE 402 may transmit the indication of the BFD or RLM failure based on the detection of the BFD or RLM failure.

As illustrated at 410, the base station 404 may transmit a relaxation configuration. The base station 404 may transit the relaxation configuration to the UE 402. The UE 402 may receive the relaxation configuration from the base station 404. The relaxation configuration may comprise at least one scaling factor. In some aspects, the relaxation configuration may configure the UE to perform a reduced rate of measurement of the one or more reference signals with a periodicity based at least in part on the at least one scaling factor. The relaxation configuration may configure the UE to measure reference signals for the RLM/BFD with a periodicity based on a default periodicity of RLM/BFD measurements multiplied by the at least one scaling factor. In some aspects, the relaxation configuration may configure the UE to reduce the rate of measuring the one or more reference signals for the RLM procedure or the BFD procedure in response to at least one measurement, by the UE, of the one or more reference signals meeting a relaxation criteria. In some aspects, the relaxation criteria may comprise at least one of a mobility criteria or a distance criteria relative to a cell. The mobility criteria may be based at least in part on the UE having a stable radio link, low mobility, or being a stationary UE. For example, the stability of the radio link may correspond to the UE having a good and stable radio link, such that the link supports the communications between the UE and the base station. In some aspects, the low mobility of the UE may correspond to the UE moving at a low speed or within a predetermined pathway within a particular location or setting. In some aspects, the stationary status of the UE may correspond to whether the UE is stationary or mobile. In some aspects, the distance criteria may correspond to the UE being remote from a cell edge based at least in part on at least one RRM measurement in a cell reselection procedure being greater than a first threshold. In some aspects, the first threshold may correspond to $S_{rxThreshold}$, where the at least one RRM measurement may correspond to $S_{rxlev}$, such that the UE may be remote from the cell edge when the at least one RRM measurement is greater than the first threshold (e.g., $S_{rxlev} > S_{rxThreshold}$). In some aspects, the first threshold may correspond to $S_{qualThreshold}$, where the RRM measurement may correspond to $S_{qual}$, such that the UE may be remote from the cell edge when the at least one RRM measurement is greater than the first threshold (e.g., $S_{qual} > S_{qualThreshold}$). The UE being remote from the cell edge may correspond to the UE not at cell edge (NACE), which may be determined based on the at least one RRM measurement in the cell reselection procedure. In some aspects, the distance criteria may correspond to the UE being remote from a cell edge based at least in part on at least one L1-RSRP measurement of the one or more reference signals for the RLM procedure or the BFD procedure being greater than a second threshold. In some aspects, the second threshold may correspond to at least one of Qout or $Q_{NACE}$, where the at least one L1-RSRP measurement may correspond to $Q_{RM/BFD}$, such that the UE may be remote from a cell edge (e.g., NACE) when $Q_{RM/BFD} > Qout + Q_{NACE}$, where $Q_{NACE}$ may be configured by the network. The at least one L1-RSRP measurement may comprise at least one filtered L1-RSRP measurement averaged over a time window. For example, $Q_{RM/BFD}$ may correspond to the time average of the at least one filtered L1-RSRP measurement of the RLM/BFD reference signals. In some aspects, the distance criteria may correspond to the UE being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement is greater than the third threshold. A counter, instead of time averaging, of the at least one L1-RSRP measurement (e.g., $Q_{RM/BFD}$) may be used on the reference signals for the RLM/BFD. In some aspects, the third threshold may correspond to $Qout + Q_{NACE}$, such that the relaxation counter is incremented by one when $Q_{RM/BFD} > Qout + Q_{NACE}$. In some aspects, the relaxation criteria may be based at least in part on the rate of the measuring the one or more reference signals for the RLM procedure or the BFD procedure is less than a configured maximum measurement periodicity.

As illustrated at 412, the base station 404 may transmit an indication enabling a reduction of the rate of the measuring the one or more reference signals for the RLM procedure or the BFD procedure. The base station may transmit the indication enabling a reduction of the rate of the measuring the one or more reference signals for the RLM procedure or the BFD procedure to the UE 402. The UE 402 may receive the indication enabling the reduction of the rate of the measuring the one or more reference signals for the RLM procedure or the BFD procedure from the base station 404. The indication enabling the reduction of the rate of measuring the one or more reference signals may be signaled (e.g., broadcast) in system information, or via dedicated signaling (e.g., via RRC signaling providing RLM/BFD configurations to the UE). In some aspects, the indication may comprise a relaxation configuration indicating a reduction of the rate of the measuring of the one or more reference signals based at least in part on a serving cell basis, for a special cell (SpCell) only, or for all secondary cells (SCell) only. For example, for reducing the rate of measuring one or more reference signals for the BFD procedure, the relaxation configuration may be configured based on the serving cell, or for the SPCell only, or for the SCell only.

As illustrated at 414, the UE 402 may reduce a rate of the measuring the one or more reference signals for the RLM procedure or the BFD procedure. The UE may reduce the rate of the measuring the one or more reference signals for the RLM procedure or the BFD procedure based at least in part on at least one measurement of the one or more reference signals meeting a relaxation criteria. In some aspects, the relaxation criteria may comprise at least one of a mobility criteria or a distance criteria relative to a cell. The mobility criteria may be based at least in part on a stability of a radio link, a low mobility of the UE, or a stationary status of the UE. For example, the stability of the radio link may correspond to the UE having a good and stable radio link, such that the link supports the communications between the UE and the base station. In some aspects, the low mobility of the UE may correspond to the UE moving at a low speed or within a predetermined pathway within a particular location or setting. In some aspects, the stationary status of the UE may correspond to whether the UE is stationary or mobile. In some aspects, the distance criteria may correspond to the UE being remote from a cell edge based at least in part on at least one RRM measurement in a cell reselection procedure being greater than a first threshold. In some aspects, the first threshold may correspond to $S_{rxThreshold}$, where the RRM measurement may correspond to $S_{rxlev}$, such that the UE may be remote from the cell edge when at least one RRM measurement is greater than the first threshold (e.g., $S_{rxlev} > S_{rxThreshold}$). In some aspects, the first threshold may correspond to $S_{qualThreshold}$, where the RRM measurement may correspond to $S_{qual}$, such that the UE may be remote from the cell edge when at least one RRM measurement is greater than the first threshold (e.g., $S_{qual} > S_{qualThreshold}$). The UE being remote from the cell edge may correspond to the UE NACE, which may be determined based on the at least one RRM measurement in the cell reselection procedure. In some aspects, the distance criteria may correspond to the UE being remote from a cell edge (e.g., NACE) based at least in part on at least one L1-RSRP measurement of the one or more reference signals for the RLM procedure or the BFD procedure being greater than a second threshold. In some aspects, the second threshold may correspond to at least one of Qout or $Q_{NACE}$, where the at least one L1-RSRP measurement may correspond to $Q_{RM/BFD}$, such that the UE may be remote from a cell edge (e.g., NACE) when $Q_{RM/BFD}$>Qout+$Q_{NACE}$, where $Q_{NACE}$ may be configured by the network. In some aspects, the at least one L1-RSRP measurement may comprise at least one filtered L1-RSRP measurement averaged over a time window. For example, $Q_{RM/BFD}$ may correspond to the time average of the at least one filtered L1-RSRP measurement of the RLM/BFD reference signals. In some aspects, the distance criteria may correspond to the UE being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement is greater than the third threshold. A counter, instead of time averaging, of the at least one L1-RSRP measurement (e.g., $Q_{RM/BFD}$) may be used on the reference signals for the RLM/BFD. In some aspects, the third threshold may correspond to Qout+$Q_{NACE}$, such that the relaxation counter is incremented by one when $Q_{RM/BFD}$>Qout+$Q_{NACE}$. In some aspects, the mobility criteria may be based at least in part on a time average of at least one Doppler shift measurement on the one or more reference signals for the RLM procedure or the BFD procedure being less than a Doppler threshold. The UE may be considered to have a low mobility when a time average of the at least one Doppler shift measurement on all of the reference signals for the RLM/BFD is less than the Doppler threshold. The Doppler threshold may be configured by the network.

In some aspects, the UE may reduce the rate of measuring the one or more reference signals for the RLM procedure or the BFD procedure in response to the relaxation counter being within or not exceeding a counter threshold within an evaluation period.

In some aspects, the UE may reduce the rate of measurement of the one or more reference signals based at least in part on the at least one scaling factor. For example, the UE may measure reference signals for the RLM/BFD with a periodicity based on a default periodicity of RLM/BFD measurements multiplied by the at least one scaling factor. In some aspects, the scaling factor $M_{sf}$>1, such that the UE performs at least one measurement with a periodicity of the default periodicity multiplied by $M_{sf}$.

As illustrated at 416, the UE 402 may transmit a relaxation indication indicating that the UE has entered a relaxation procedure. The UE 402 may transmit the relaxation indication to the base station 404. The base station 404 may receive the relaxation indication from the UE 402. The UE may transmit the relaxation indication indicating that the UE has entered the relaxation procedure and is reducing the rate of the measuring of the one or more reference signals for the RLM procedure or the BFD procedure.

As illustrated at 418, the UE 402 may exit the relaxation procedure. The UE may exit the relaxation procedure after K measurement periods to re-evaluate the relaxation criteria. The UE may exit the relaxation procedure after K measurement periods to re-evaluate the relaxation criteria based at least in part on a radio link quality of at least one of the one or more reference signals for the RLM procedure or the BFD procedure being less than an exit threshold. In some aspects, the exit threshold may correspond to when the radio link quality drops below $Q_{out}$+$Q_{exit}$, where $Q_{exit}$ is configured by the network. The UE may reset state variables used in the relaxation criteria and start or re-start a new round of evaluation for relaxation upon the exiting of the relaxation procedure.

Figure 5:
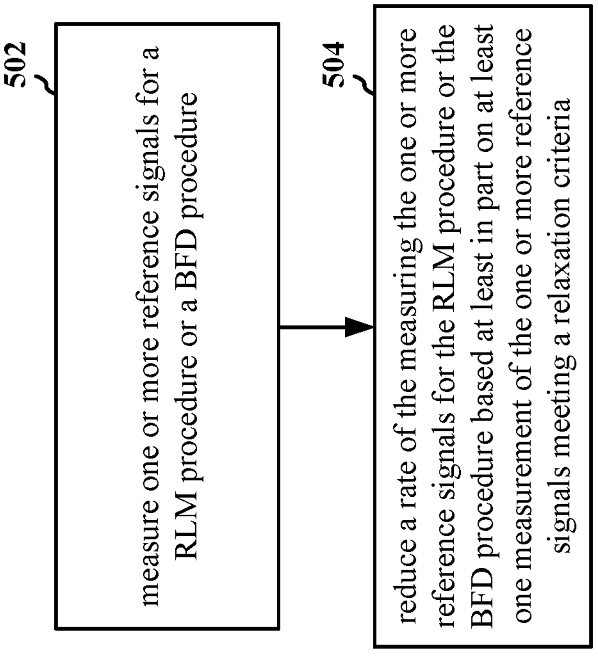
FIG. 5 is a flowchart of a method of wireless communication.

FIG. 5 is a flowchart 500 of a method of wireless communication. The method may be performed by a UE or a component of a UE (e.g., the UE 104; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may enable a UE to reduce a rate of measuring reference signals for RLM or BFD based on a relaxation configuration.

At 502, the UE may measure one or more reference signals for an RLM procedure or a BFD procedure. For example, 502 may be performed by measurement component 740 of apparatus 702. The UE may measure the one or more reference signals for the RLM procedure or the BFD procedure received from a base station. In the context of FIG. 4, the UE 402, at 408, measures one or more reference signals for the RLM procedure or the BFD procedure.

At 504, the UE may reduce a rate of the measuring the one or more reference signals for the RLM procedure or the BFD procedure. For example, 504 may be performed by relaxation component 746 of apparatus 702. The UE may reduce the rate of the measuring the one or more reference signals for the RLM procedure or the BFD procedure based at least in part on at least one measurement of the one or more reference signals meeting a relaxation criteria. In some aspects, the relaxation criteria may comprise at least one of a mobility criteria or a distance criteria relative to a cell. The mobility criteria may be based at least in part on a stability of a radio link, a low mobility of the UE, or a stationary status of the UE. For example, the stability of the radio link may correspond to the UE having a good and stable radio link, such that the link supports the communications between the UE and the base station. In some aspects, the low mobility of the UE may correspond to the UE moving at a low speed or within a predetermined pathway within a particular location or setting. In some aspects, the stationary status of the UE may correspond to whether the UE is stationary or mobile. In some aspects, the distance criteria may correspond to the UE being remote from a cell edge based at least in part on at least one radio resource management (RRM) measurement in a cell reselection procedure being greater than a first threshold. In some aspects, the first threshold may correspond to $S_{rxThreshold}$, where the RRM measurement may correspond to $S_{rxlev}$, such that the UE may be remote from the cell edge when the at least one RRM measurement is greater than the first threshold (e.g., $S_{rxlev}$>$S_{rxThreshold}$). In some aspects, the first threshold may correspond to $S_{qualThreshold}$, where the RRM measurement may correspond to $S_{qual}$, such that the UE may be remote from the cell edge when at least one RRM measurement is greater than the first threshold (e.g., $S_{qual}$>$S_{qualThreshold}$). The UE being remote from the cell edge may correspond to the UE not at cell edge (NACE), which may be determined based on the at least one RRM measurement in the cell reselection procedure. In some aspects, the distance criteria may correspond to the UE being remote from a cell edge (e.g., NACE) based at least in part on at least one layer 1 reference signal received power (L1-RSRP) measurement of the one or more reference signals for the RLM procedure or the BFD procedure being greater than a second threshold. In some aspects, the second threshold may correspond to at least one of Qout or $Q_{NACE}$, where the at least one L1-RSRP measurement may correspond to $Q_{RM/BFD}$, such that the UE may be remote from a cell edge (e.g., NACE) when $Q_{RM/BFD}$>Qout+$Q_{NACE}$, where $Q_{NACE}$ may be configured by the network. In some aspects, the at least one L1-RSRP measurement may comprise at least one filtered L1-RSRP measurement averaged over a time window. For example, $Q_{RM/BFD}$ may correspond to the time average of the at least one filtered L1-RSRP measurement of the RLM/BFD reference signals. In some aspects, the distance criteria may correspond to the UE being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement is greater than the third threshold. A counter, instead of time averaging, of the at least one L1-RSRP measurement (e.g., $Q_{RM/BFD}$) may be used on the reference signals for the RLM/BFD. In some aspects, the third threshold may correspond to Qout+$Q_{NACE}$, such that the relaxation counter is incremented by one when $Q_{RM/BFD}$>Qout+$Q_{NACE}$. In some aspects, the mobility criteria may be based at least in part on a time average of at least one Doppler shift measurement on the one or more reference signals for the RLM procedure or the BFD procedure being less than a Doppler threshold. The UE may be considered to have a low mobility when a time average of the at least one Doppler shift measurement on all of the reference signals for the RLM/BFD is less than the Doppler threshold. The Doppler threshold may be configured by the network. In the context of FIG. 4, the UE 402, at 414, reduces a rate of the measuring the one or more reference signals for the RLM procedure or the BFD procedure.

Figure 6:
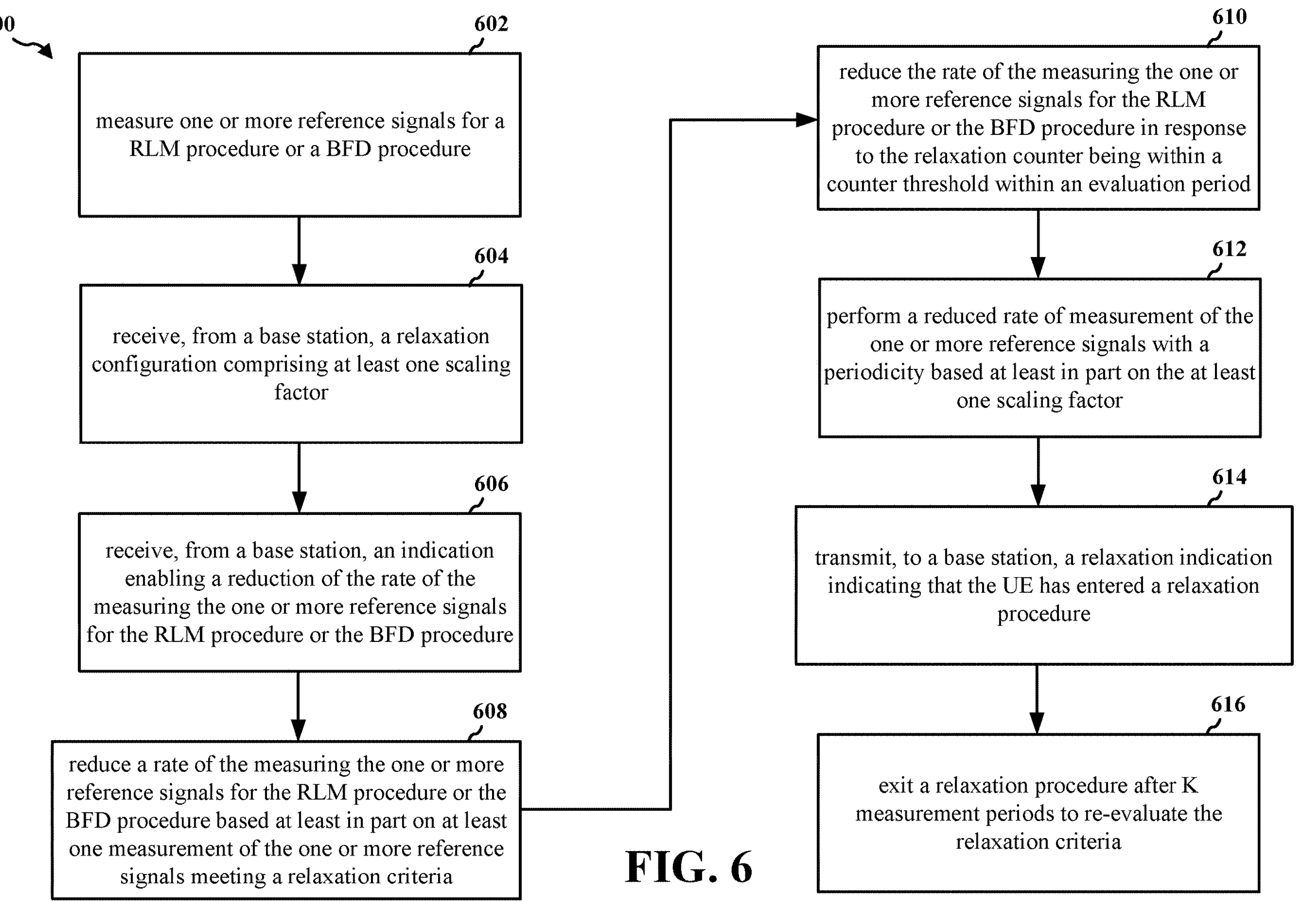
FIG. 6 is a flowchart of a method of wireless communication.

FIG. 6 is a flowchart 600 of a method of wireless communication. The method may be performed by a UE or a component of a UE (e.g., the UE 104; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may enable a UE to reduce a rate of measuring reference signals for RLM or BFD based on a relaxation configuration.

At 602, the UE may measure one or more reference signals for an RLM procedure or a BFD procedure. For example, 602 may be performed by measurement component 740 of apparatus 702. The UE may measure the one or more reference signals for the RLM procedure or the BFD procedure received from a base station. In the context of FIG. 4, the UE 402, at 408, measures one or more reference signals for the RLM procedure or the BFD procedure.

At 604, the UE may receive a relaxation configuration. For example, 604 may be performed by relaxation configuration component 742 of apparatus 702. The UE may receive the relaxation configuration from the base station. The relaxation configuration may comprise at least one scaling factor. The relaxation configuration may configure the UE to measure reference signals for the RLM/BFD with a periodicity based on a default periodicity of RLM/BFD measurements multiplied by the at least one scaling factor. In the context of FIG. 4, the UE 402, at 410, receives a relaxation configuration from the base station 404.

At 606, the UE may receive an indication enabling a reduction of the rate of the measuring the one or more reference signals for the RLM procedure or the BFD procedure. For example, 606 may be performed by indication component 744 of apparatus 702. The UE may receive the indication enabling a reduction of the rate of the measuring the one or more reference signals for the RLM procedure or the BFD procedure from the base station. In some aspects, the indication may comprise a relaxation configuration indicating a reduction of the rate of the measuring of the one or more reference signals based at least in part on a serving cell basis, for a SpCell only, or for all SCell only. In the context of FIG. 4, the UE 402, at 412, receives an indication enabling the reduction of the rate of the measuring the one or more reference signals for the RLM procedure or the BFD procedure.

At 608, the UE may reduce a rate of the measuring the one or more reference signals for the RLM procedure or the BFD procedure. For example, 608 may be performed by relaxation component 746 of apparatus 702. The UE may reduce the rate of the measuring the one or more reference signals for the RLM procedure or the BFD procedure based at least in part on at least one measurement of the one or more reference signals meeting a relaxation criteria. In some aspects, the relaxation criteria may comprise at least one of a mobility criteria or a distance criteria relative to a cell. The mobility criteria may be based at least in part on a stability of a radio link, a low mobility of the UE, or a stationary status of the UE. For example, the stability of the radio link may correspond to the UE having a good and stable radio link, such that the link supports the communications between the UE and the base station. In some aspects, the low mobility of the UE may correspond to the UE moving at a low speed or within a predetermined pathway within a particular location or setting. In some aspects, the stationary status of the UE may correspond to whether the UE is stationary or mobile. In some aspects, the distance criteria may correspond to the UE being remote from a cell edge based at least in part on at least one RRM measurement in a cell reselection procedure being greater than a first threshold. In some aspects, the first threshold may correspond to $S_{rxThreshold}$, where the RRM measurement may correspond to $S_{rxlev}$, such that the UE may be remote from the cell edge when at least one RRM measurement is greater than the first threshold (e.g., $S_{rxlev}$>$S_{rxThreshold}$). In some aspects, the first threshold may correspond to $S_{qualThreshold}$, where the RRM measurement may correspond to $S_{qual}$, such that the UE may be remote from the cell edge when at least one RRM measurement is greater than the first threshold (e.g., $S_{qual}$>$S_{qualThreshold}$). The UE being remote from the cell edge may correspond to the UE NACE, which may be determined based on the at least one RRM measurement in the cell reselection procedure. In some aspects, the distance criteria may correspond to the UE being remote from a cell edge (e.g., NACE) based at least in part on at least one L1-RSRP measurement of the one or more reference signals for the RLM procedure or the BFD procedure being greater than a second threshold. In some aspects, the second threshold may correspond to at least one of Qout or $Q_{NACE}$, where the at least one L1-RSRP measurement may correspond to $Q_{RM/BFD}$, such that the UE may be remote from a cell edge (e.g., NACE) when $Q_{RM/BFD}$>Qout+$Q_{NACE}$, where $Q_{NACE}$ may be configured by the network. In some aspects, the at least one L1-RSRP measurement may comprise at least one filtered L1-RSRP measurement averaged over a time window. For example, $Q_{RM/BFD}$ may correspond to the time average of the at least one filtered L1-RSRP measurement of the RLM/BFD reference signals. In some aspects, the distance criteria may correspond to the UE being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement are greater than the third threshold. A counter, instead of time averaging, of the at least one L1-RSRP measurement (e.g., $Q_{RM/BFD}$) may be used on the reference signals for the RLM/BFD. In some aspects, the third threshold may correspond to Qout+$Q_{NACE}$, such that the relaxation counter is incremented by one when $Q_{RM/BFD}$>Qout+$Q_{NACE}$. In some aspects, the mobility criteria may be based at least in part on a time average of at least one Doppler shift measurement on the one or more reference signals for the RLM procedure or the BFD procedure being less than a Doppler threshold. The UE may be considered to have a low mobility when a time average of the at least one Doppler shift measurement on all of the reference signals for the RLM/BFD is less than the Doppler threshold. The Doppler threshold may be configured by the network. In the context of FIG. 4, the UE 402, at 414, reduces a rate of the measuring the one or more reference signals for the RLM procedure or the BFD procedure.

At 610, the UE may reduce the rate of the measuring the one or more reference signals for the RLM procedure or the BFD procedure. For example, 610 may be performed by relaxation component 746 of apparatus 702. The UE may reduce the rate of the measuring the one or more reference signals for the RLM procedure or the BFD procedure in response to the relaxation counter being within or not exceeding a counter threshold within an evaluation period. In the context of FIG. 4, the UE 402, at 414, reduces a rate of the measuring the one or more reference signals for the RLM procedure or the BFD procedure.

At 612, the UE may perform a reduced rate of measurement of the one or more reference signals. For example, 612 may be performed by relaxation component 746 of apparatus 702. The UE may perform the reduced rate of measurement of the one or more reference signals based at least in part on the at least one scaling factor. For example, the UE may measure reference signals for the RLM/BFD with a periodicity based on a default periodicity of RLM/BFD measurements multiplied by the at least one scaling factor. In some aspects, the scaling factor $M_{sf}$>1, such that the UE performs at least one measurement with a periodicity of the default periodicity multiplied by $M_{sf}$. In the context of FIG. 4, the UE 402, at 414, reduces a rate of the measuring the one or more reference signals for the RLM procedure or the BFD procedure.

At 614, the UE may transmit a relaxation indication indicating that the UE has entered a relaxation procedure. For example, 614 may be performed by indication component 744 of apparatus 702. The UE may transmit the relaxation indication indicating that the UE has entered the relaxation procedure and is reducing the rate of the measuring of the one or more reference signals for the RLM procedure or the BFD procedure. The UE may transmit the relaxation indication to the base station. In the context of FIG. 4, the UE 402, at 416, may transmit a relaxation indication indicating that the UE has entered a relaxation procedure to the base station 404.

At 616, the UE may exit a relaxation procedure. For example, 616 may be performed by relaxation component 746 of apparatus 702. The UE may exit the relaxation procedure after K measurement periods to re-evaluate the relaxation criteria. The UE may exit the relaxation procedure after K measurement periods to re-evaluate the relaxation criteria based at least in part on a radio link quality of at least one of the one or more reference signals for the RLM procedure or the BFD procedure being less than an exit threshold. In some aspects, the exit threshold may correspond to when the radio link quality drops below $Q_{out}$+$Q_{exit}$, where $Q_{exit}$ is configured by the network. The UE may reset state variables used in the relaxation criteria and start or re-start a new round of evaluation for relaxation upon the exiting of the relaxation procedure. In the context of FIG. 4, the UE 402, at 418 may exit the relaxation procedure.

Figure 7:
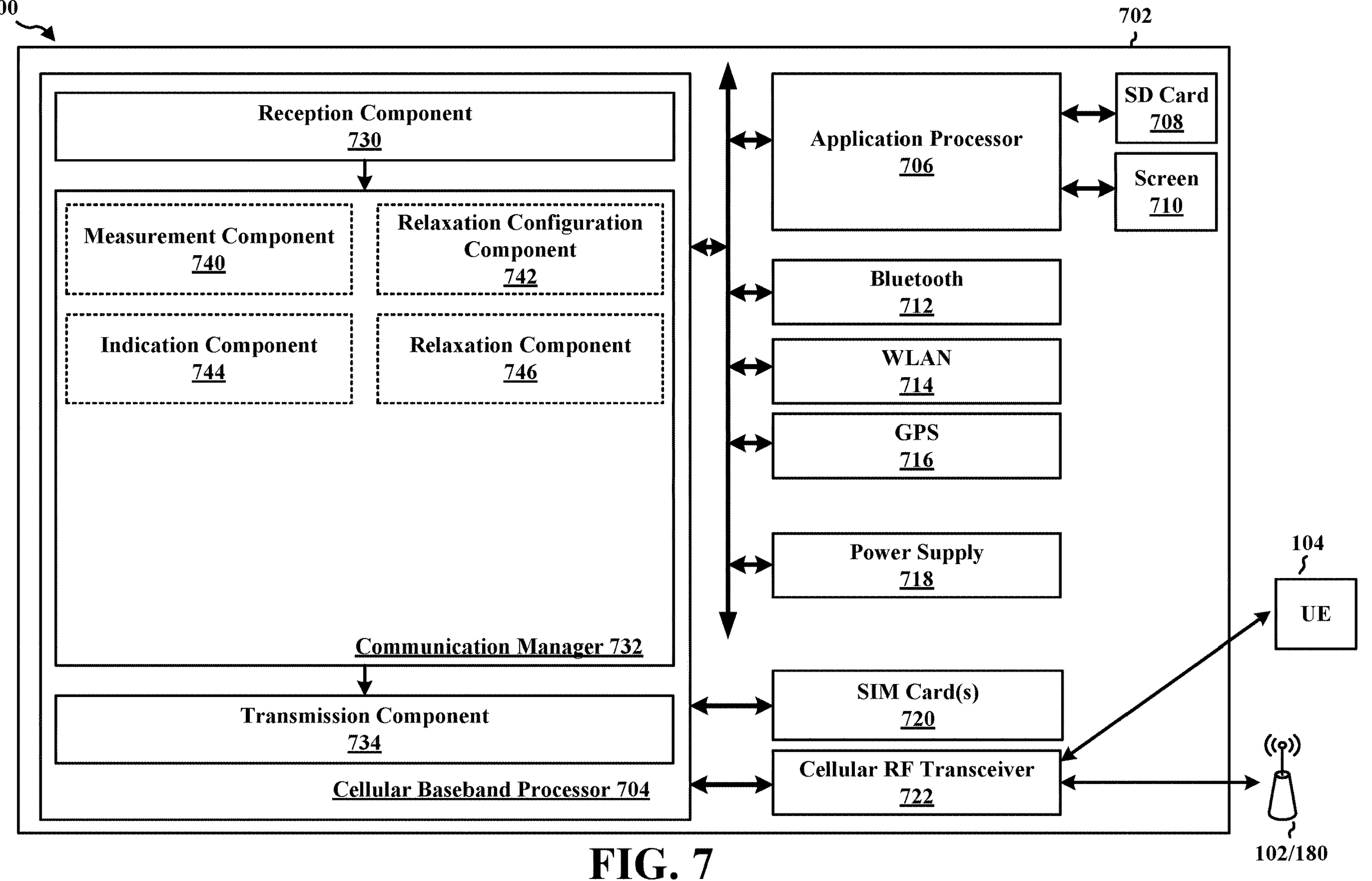
FIG. 7 is a diagram illustrating an example of a hardware implementation for an example apparatus.

FIG. 7 is a diagram 700 illustrating an example of a hardware implementation for an apparatus 702. The apparatus 702 may be a UE, a component of a UE, or may implement UE functionality. In some aspects, the apparatus 902 may include a cellular baseband processor 704 (also referred to as a modem) coupled to a cellular RF transceiver 722. In some aspects, the apparatus 702 may further include one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, or a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the additional modules of the apparatus 702.

The communication manager 732 includes a measurement component 740 that is configured to measure one or more reference signals for an RLM procedure or a BFD procedure, e.g., as described in connection with 502 of FIG. 5 or 602 of FIG. 6. The communication manager 732 further includes a relaxation configuration component 742 that is configured to receive a relaxation configuration, e.g., as described in connection with 604 of FIG. 6. The communication manager 732 further includes an indication component 744 that is configured to receive an indication enabling a reduction of the rate of the measuring the one or more reference signals for the RLM procedure or the BFD procedure, e.g., as described in connection with 606 of FIG. 6. The indication component 744 may be further configured to transmit a relaxation indication indicating that the UE has entered a relaxation procedure, e.g., as described in connection with 614 of FIG. 6. The communication manager 732 further includes a relaxation component 746 that is configured to reduce a rate of the measuring the one or more reference signals for the RLM procedure or the BFD procedure, e.g., as described in connection with 504 of FIG. 5 or 608 of FIG. 6. The relaxation component 746 may be further configured to reduce the rate of the measuring the one or more reference signals for the RLM procedure or the BFD procedure, e.g., as described in connection with 610 of FIG. 6. The relaxation component 746 may be further configured to perform a reduced rate of measurement of the one or more reference signals, e.g., as described in connection with 612 of FIG. 6. The relaxation component 746 may be further configured to exit a relaxation procedure, e.g., as described in connection with 616 of FIG. 6.

The apparatus may include additional components that perform each of the blocks of the algorithm in the flowcharts of FIGS. 5 and 6. As such, each block in the flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 702 may include a variety of components configured for various functions. In one configuration, the apparatus 702, and in particular the cellular baseband processor 704, includes means for measuring one or more reference signals for an RLM procedure or a BFD procedure. The apparatus includes means for reducing a rate of the measuring the one or more reference signals for the RLM procedure or the BFD procedure based at least in part on at least one measurement of the one or more reference signals meeting a relaxation criteria. The apparatus further includes means for reducing the rate of the measuring the one or more reference signals for the RLM procedure or the BFD procedure in response to the relaxation counter being within or not exceeding a counter threshold within an evaluation period. The apparatus further includes means for receiving, from a base station, an indication enabling a reduction of the rate of the measuring the one or more reference signals for the RLM procedure or the BFD procedure. The apparatus further includes means for receiving, from a base station, a relaxation configuration comprising at least one scaling factor. The apparatus further includes means for performing a reduced rate of measurement of the one or more reference signals with a periodicity based at least in part on the at least one scaling factor. The apparatus further includes means for exiting a relaxation procedure after K measurement periods to re-evaluate the relaxation criteria based at least in part on a radio link quality of at least one of the one or more reference signals for the RLM procedure or the BFD procedure is less than an exit threshold. The apparatus further includes means for transmitting, to a base station, a relaxation indication indicating that the UE has entered a relaxation procedure and is reducing the rate of the measuring of the one or more reference signals for the RLM procedure or the BFD procedure. The means may be one or more of the components of the apparatus 702 configured to perform the functions recited by the means. As described supra, the apparatus 702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 8:
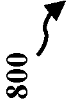
FIG. 8 is a flowchart of a method of wireless communication.
Figure 8:
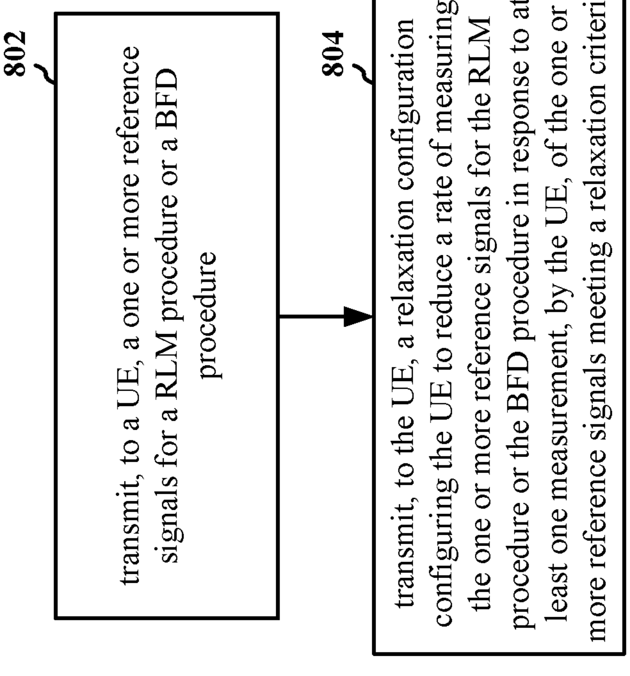

FIG. 8 is a flowchart 800 of a method of wireless communication. The method may be performed by a base station or a component of a base station (e.g., the base station 102/180; the apparatus 1002; the baseband unit 1004, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to provide a UE with a relaxation configuration configuring the UE to reduce a rate of measuring reference signals for RLM or BFD.

At 802, the base station may transmit one or more reference signals for an RLM procedure or a BFD procedure. For example, 802 may be performed by RS component 1040 of apparatus 1002. The base station may transmit the one or more reference signals for the RLM procedure or the BFD procedure to a UE. In the context of FIG. 4, the base station 404, at 406 transmits one or more reference signals for an RLM procedure or a BFD procedure to the UE 402.

At 804, the base station may transmit, to the UE, a relaxation configuration configuring the UE to reduce a rate of measuring the one or more reference signals for the RLM procedure or the BFD procedure. For example, 804 may be performed by relaxation configuration component 1042 of apparatus 1002. The base station may transmit the relaxation configuration configuring the UE to reduce the rate of measuring the one or more reference signals for the RLM procedure or the BFD procedure in response to at least one measurement, by the UE, of the one or more reference signals meeting a relaxation criteria. In some aspects, the relaxation criteria may comprise at least one of a mobility criteria or a distance criteria relative to a cell. The mobility criteria may be based at least in part on the UE having a stable radio link, low mobility, or being a stationary UE. For example, the stability of the radio link may correspond to the UE having a good and stable radio link, such that the link supports the communications between the UE and the base station. In some aspects, the low mobility of the UE may correspond to the UE moving at a low speed or within a predetermined pathway within a particular location or setting. In some aspects, the stationary status of the UE may correspond to whether the UE is stationary or mobile. In some aspects, the distance criteria may correspond to the UE being remote from a cell edge based at least in part on at least one RRM measurement in a cell reselection procedure being greater than a first threshold. In some aspects, the first threshold may correspond to $S_{rxThreshold}$, where the RRM measurement may correspond to $S_{rxlev}$, such that the UE may be remote from the cell edge when at least one RRM measurement is greater than the first threshold (e.g., $S_{rxlev}>S_{rxThreshold}$). In some aspects, the first threshold may correspond to $S_{qualThreshold}$, where the RRM measurement may correspond to $S_{qual}$, such that the UE may be remote from the cell edge when at least one RRM measurement is greater than the first threshold (e.g., $S_{qual}>S_{qualThreshold}$). The UE being remote from the cell edge may correspond to the UE not at cell edge (NACE), which may be determined based on the at least one RRM measurement in the cell reselection procedure. In some aspects, the distance criteria may correspond to the UE being remote from a cell edge based at least in part on at least one L1-RSRP measurement of the one or more reference signals for the RLM procedure or the BFD procedure being greater than a second threshold. In some aspects, the second threshold may correspond to at least one of Qout or $Q_{NACE}$, where the at least one L1-RSRP measurement may correspond to $Q_{RM/BFD}$, such that the UE may be remote from a cell edge (e.g., NACE) when $Q_{RM/BFD}>Qout+Q_{NACE}$, where $Q_{NACE}$ may be configured by the network. The at least one L1-RSRP measurement may comprise at least one filtered L1-RSRP measurement averaged over a time window. For example, $Q_{RM/BFD}$ may correspond to the time average of the at least one filtered L1-RSRP measurement of the RLM/BFD reference signals. In some aspects, the distance criteria may correspond to the UE being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement are greater than the third threshold. A counter, instead of time averaging, of the at least one L1-RSRP measurement (e.g., $Q_{RM/BFD}$) may be used on the reference signals for the RLM/BFD. In some aspects, the third threshold may correspond to Qout+$Q_{NACE}$, such that the relaxation counter is incremented by one when $Q_{RM/BFD}$>Qout+$Q_{NACE}$. In some aspects, the relaxation criteria may be based at least in part on the rate of the measuring the one or more reference signals for the RLM procedure or the BFD procedure is less than a configured maximum measurement periodicity. In the context of FIG. 4, the base station 404, at 410, may transmit a relaxation configuration to the UE 402.

Figure 9:
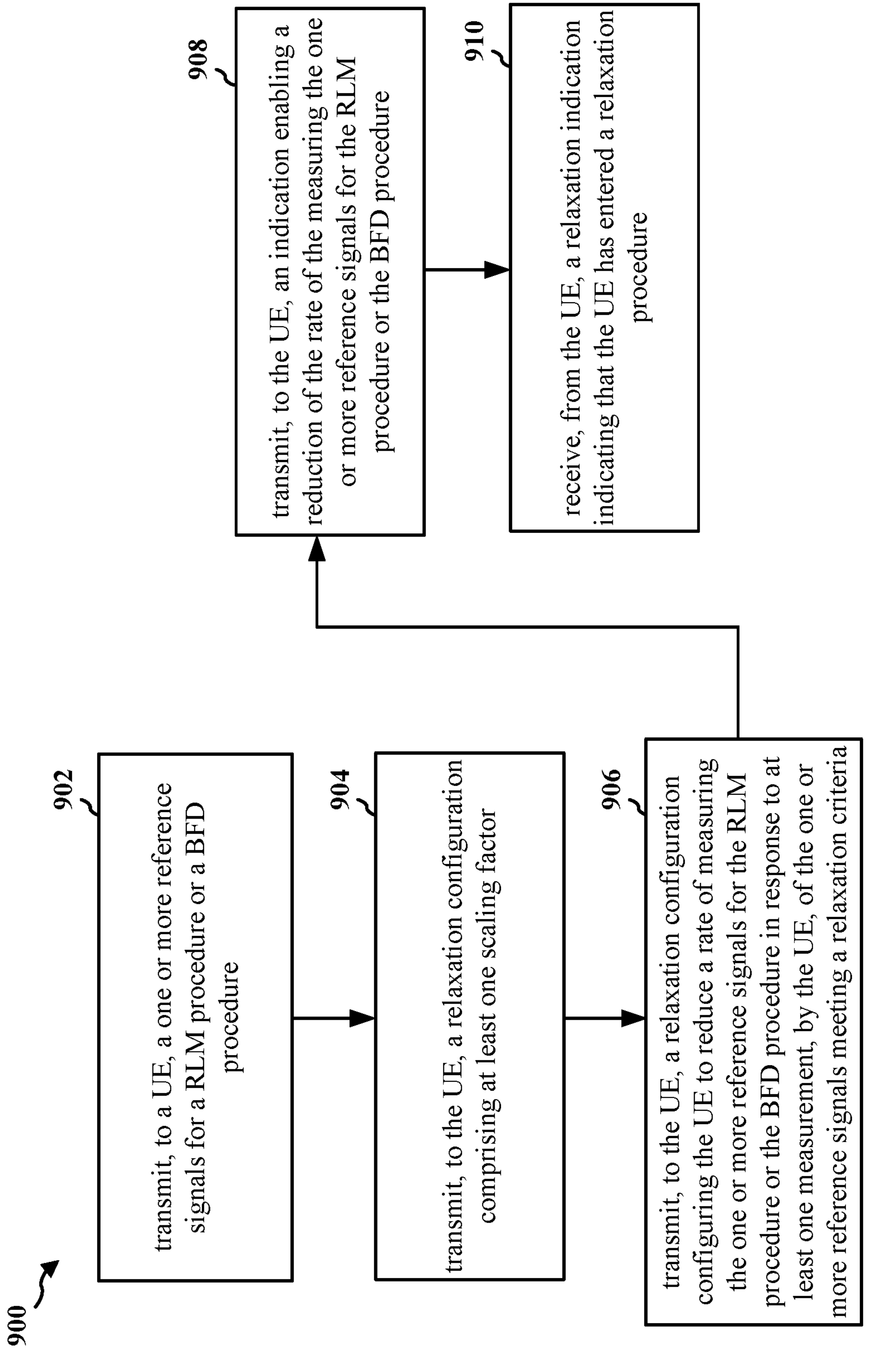
FIG. 9 is a flowchart of a method of wireless communication.

FIG. 9 is a flowchart 900 of a method of wireless communication. The method may be performed by a base station or a component of a base station (e.g., the base station 102/180; the apparatus 1002; the baseband unit 1004, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to provide a UE with a relaxation configuration configuring the UE to reduce a rate of measuring reference signals for RLM or BFD.

At 902, the base station may transmit one or more reference signals for an RLM procedure or a BFD procedure. For example, 902 may be performed by RS component 1040 of apparatus 1002. The base station may transmit the one or more reference signals for the RLM procedure or the BFD procedure to a UE. In the context of FIG. 4, the base station 404, at 406 transmits one or more reference signals for an RLM procedure or a BFD procedure to the UE 402.

At 904, the base station may transmit a relaxation configuration. For example, 904 may be performed by relaxation configuration component 1042 of apparatus 1002. The base station may transit the relaxation configuration to the UE. The relaxation configuration may comprise at least one scaling factor. The relaxation configuration may configure the UE to perform a reduced rate of measurement of the one or more reference signals with a periodicity based at least in part on the at least one scaling factor. The relaxation configuration may configure the UE to measure reference signals for the RLM/BFD with a periodicity based on a default periodicity of RLM/BFD measurements multiplied by the at least one scaling factor. In the context of FIG. 4, the base station 404, at 410, may transmit a relaxation configuration to the UE 402.

At 906, the base station may transmit, to the UE, a relaxation configuration configuring the UE to reduce a rate of measuring the one or more reference signals for the RLM procedure or the BFD procedure. For example, 906 may be performed by relaxation configuration component 1042 of apparatus 1002. The base station may transmit the relaxation configuration configuring the UE to reduce the rate of measuring the one or more reference signals for the RLM procedure or the BFD procedure in response to at least one measurement, by the UE, of the one or more reference signals meeting a relaxation criteria. In some aspects, the relaxation criteria may comprise at least one of a mobility criteria or a distance criteria relative to a cell. The mobility criteria may be based at least in part on the UE having a stable radio link, low mobility, or being a stationary UE. For example, the stability of the radio link may correspond to the UE having a good and stable radio link, such that the link supports the communications between the UE and the base station. In some aspects, the low mobility of the UE may correspond to the UE moving at a low speed or within a predetermined pathway within a particular location or setting. In some aspects, the stationary status of the UE may correspond to whether the UE is stationary or mobile. In some aspects, the distance criteria may correspond to the UE being remote from a cell edge based at least in part on at least one RRM measurement in a cell reselection procedure being greater than a first threshold. In some aspects, the first threshold may correspond to $S_{rxThreshold}$, where the RRM measurement may correspond to $S_{rxlev}$, such that the UE may be remote from the cell edge when at least one RRM measurement is greater than the first threshold (e.g., $S_{rxlev}$>$S_{rxThreshold}$). In some aspects, the first threshold may correspond to $S_{qualThreshold}$, where the RRM measurement may correspond to $S_{qual}$, such that the UE may be remote from the cell edge when at least one RRM measurement is greater than the first threshold (e.g., $S_{qual}$>$S_{qualThreshold}$). The UE being remote from the cell edge may correspond to the UE not at cell edge (NACE), which may be determined based on the at least one RRM measurement in the cell reselection procedure. In some aspects, the distance criteria may correspond to the UE being remote from a cell edge based at least in part on at least one L1-RSRP measurement of the one or more reference signals for the RLM procedure or the BFD procedure being greater than a second threshold. In some aspects, the second threshold may correspond to at least one of Qout or $Q_{NACE}$, where the at least one L1-RSRP measurement may correspond to $Q_{RM/BFD}$, such that the UE may be remote from a cell edge (e.g., NACE) when $Q_{RM/BFD}$>Qout+$Q_{NACE}$, where $Q_{NACE}$ may be configured by the network. The at least one L1-RSRP measurement may comprise at least one filtered L1-RSRP measurement averaged over a time window. For example, $Q_{RM/BFD}$ may correspond to the time average of the at least one filtered L1-RSRP measurement of the RLM/BFD reference signals. In some aspects, the distance criteria may correspond to the UE being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement is greater than the third threshold. A counter, instead of time averaging, of the at least one L1-RSRP measurement (e.g., $Q_{RM/BFD}$) may be used on the reference signals for the RLM/BFD. In some aspects, the third threshold may correspond to Qout+$Q_{NACE}$, such that the relaxation counter is incremented by one when $Q_{RM/BFD}$>Qout+$Q_{NACE}$. In some aspects, the relaxation criteria may be based at least in part on the rate of the measuring the one or more reference signals for the RLM procedure or the BFD procedure is less than a configured maximum measurement periodicity. In the context of FIG. 4, the base station 404, at 410, may transmit a relaxation configuration to the UE 402.

At 908, the base station may transmit an indication enabling a reduction of the rate of the measuring the one or more reference signals for the RLM procedure or the BFD procedure. For example, 908 may be performed by indication component 1044 of apparatus 1002. The base station may transmit the indication enabling a reduction of the rate of the measuring the one or more reference signals for the RLM procedure or the BFD procedure to the UE. In some aspects, the indication may comprise a relaxation configuration indicating a reduction of the rate of the measuring of the one or more reference signals based at least in part on a serving cell basis, for a SpCell only, or for all SCell only. In the context of FIG. 4, the base station 404, at 412, transmits an indication enabling a reduction of the rate of measuring the one or more reference signals for the RLM procedure or the BFD procedure to the UE 402.

At 910, the base station may receive a relaxation indication indicating that the UE has entered a relaxation procedure. For example, 910 may be performed by relaxation component 1046 of apparatus 1002. The base station may receive the relaxation indication indicating that the UE has entered a relaxation procedure and is reducing the rate of the measuring of the one or more reference signals for the RLM procedure or the BFD procedure. The base station may receive the relaxation indication from the UE. In the context of FIG. 4, the base station 404, at 416, receives, from the UE 402, a relaxation indication indicating that the UE has entered a relaxation procedure.

Figure 10:
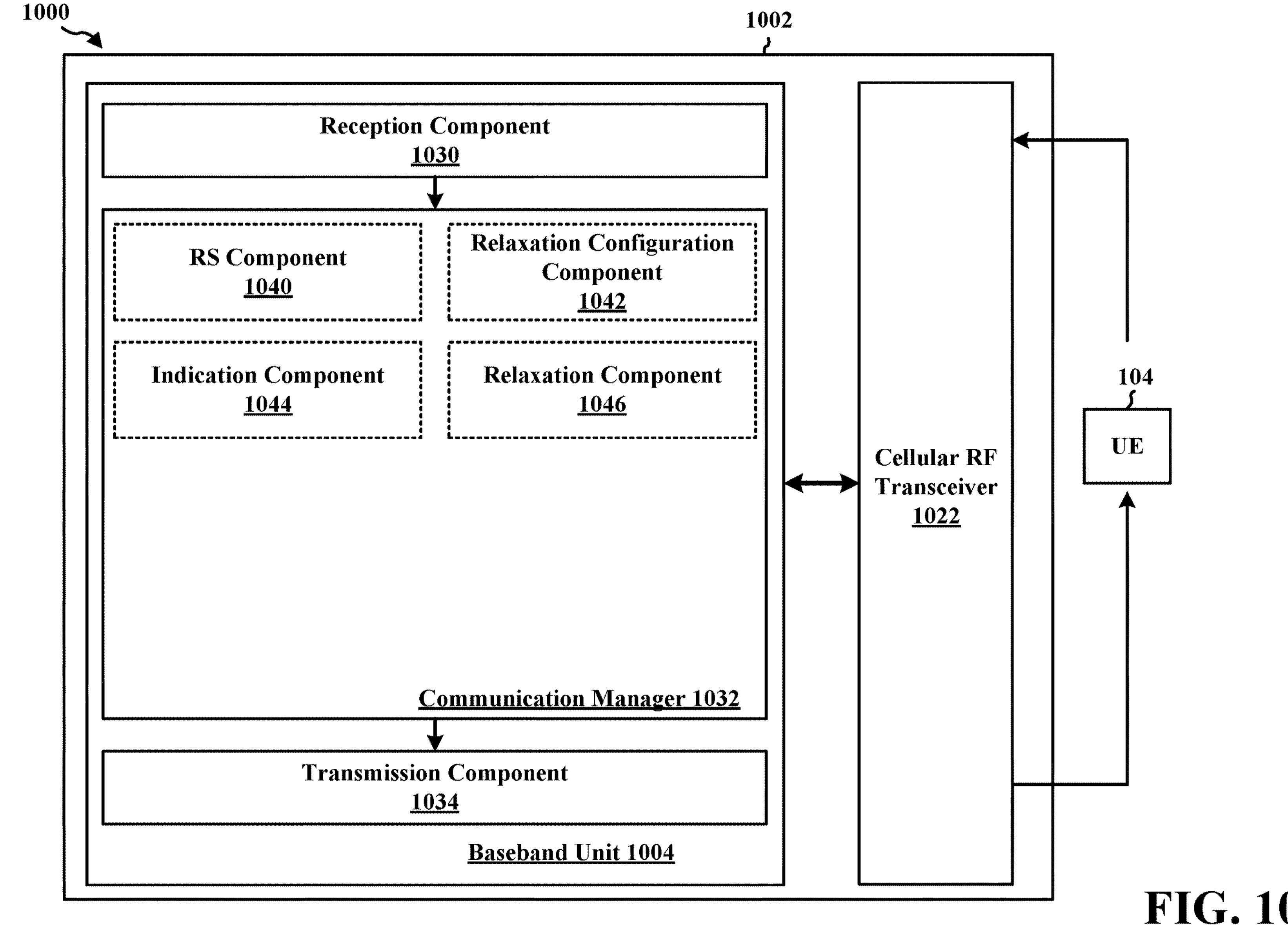
FIG. 10 is a diagram illustrating an example of a hardware implementation for an example apparatus.
Figure 11:
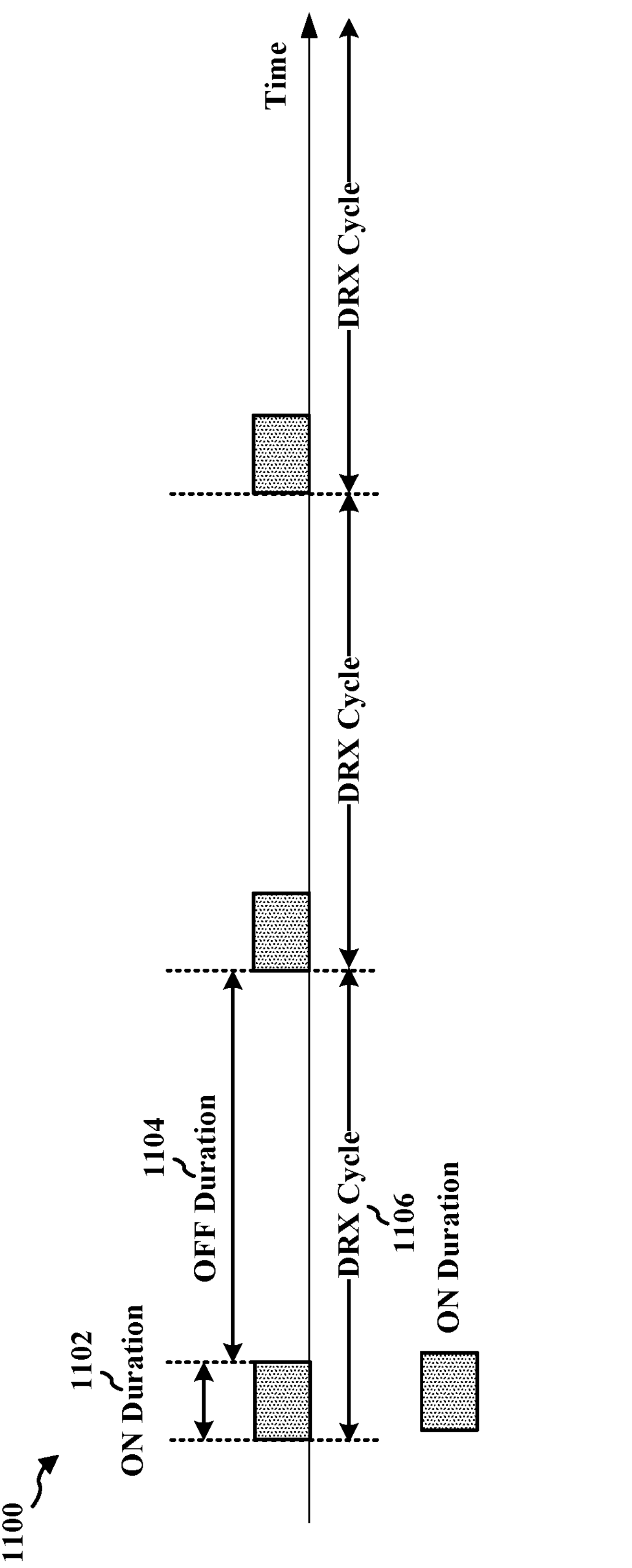
FIG. 11 is a diagram illustrating an example of a discontinuous reception (DRX) configuration.

FIG. 10 is a diagram 1000 illustrating an example of a hardware implementation for an apparatus 1002. The apparatus 1002 may be a base station, a component of a base station, or may implement base station functionality. In some aspects, the apparatus 1002 may include a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes an RS component 1040 that may transmit one or more reference signals for an RLM procedure or a BFD procedure, e.g., as described in connection with 802 of FIG. 8 or 902 of FIG. 9. The communication manager 1032 further includes a relaxation configuration component 1042 that may transmit a relaxation configuration, e.g., as described in connection with 904 of FIG. 9. The relaxation configuration component 1042 may be further configured to transmit, to the UE, a relaxation configuration configuring the UE to reduce a rate of measuring the one or more reference signals for the RLM procedure or the BFD procedure, e.g., as described in connection with 804 of FIG. 8 or 906 of FIG. 9. The communication manager 1032 further includes an indication component 1044 that may transmit an indication enabling a reduction of the rate of the measuring the one or more reference signals for the RLM procedure or the BFD procedure, e.g., as described in connection with 908 of FIG. 9. The communication manager 1032 further includes a relaxation component 1046 that may receive a relaxation indication indicating that the UE has entered a relaxation procedure, e.g., as described in connection with 910 of FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for transmitting, to a UE, a one or more reference signals for an RLM procedure or a BFD procedure. The apparatus includes means for transmitting, to the UE, a relaxation configuration configuring the UE to reduce a rate of measuring the one or more reference signals for the RLM procedure or the BFD procedure in response to at least one measurement, by the UE, of the one or more reference signals meeting a relaxation criteria. The apparatus further includes means for transmitting, to the UE, an indication enabling a reduction of the rate of the measuring the one or more reference signals for the RLM procedure or the BFD procedure. The apparatus further includes means for transmitting, to the UE, a relaxation configuration comprising at least one scaling factor. The UE is configured to perform a reduced rate of measurement of the one or more reference signals with a periodicity based at least in part on the at least one scaling factor. The apparatus includes means for receiving, from the UE, a relaxation indication indicating that the UE has entered a relaxation procedure and is reducing the rate of the measuring of the one or more reference signals for the RLM procedure or the BFD procedure. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to measure one or more reference signals for an RLM procedure or a BFD procedure; and reduce a rate of the measuring the one or more reference signals for the RLM procedure or the BFD procedure based at least in part on at least one measurement of the one or more reference signals meeting a relaxation criteria.

Aspect 2 is the apparatus of aspect 1, further including a transceiver coupled to the at least one processor.

Aspect 3 is the apparatus of any of aspects 1 and 2, further includes that the relaxation criteria comprises at least one of a mobility criteria or a distance criteria relative to a cell.

Aspect 4 is the apparatus of any of aspects 1-3, further includes that the mobility criteria is based at least in part on a stability of a radio link, a low mobility of the UE, or a stationary status of the UE.

Aspect 5 is the apparatus of any of aspects 1-4, further includes that the distance criteria corresponds to the UE being remote from a cell edge based at least in part on at least one RRM measurement in a cell reselection procedure being greater than a first threshold.

Aspect 6 is the apparatus of any of aspects 1-5, further includes that the distance criteria corresponds to the UE being remote from a cell edge based at least in part on at least one L1-RSRP measurement of the one or more reference signals for the RLM procedure or the BFD procedure being greater than a second threshold.

Aspect 7 is the apparatus of any of aspects 1-6, further includes that the at least one L1-RSRP measurement comprises at least one filtered L1-RSRP measurement averaged over a time window.

Aspect 8 is the apparatus of any of aspects 1-7, further includes that the distance criteria corresponds to the UE being remote from a cell edge based at least in part on at least one L1-RSRP measurement of the one or more reference signals for the RLM procedure or the BFD procedure being greater than a third threshold, wherein a relaxation counter is incremented by one when the at least one L1-RSRP measurement is greater than the third threshold.

Aspect 9 is the apparatus of any of aspects 1-8, further includes that the at least one processor and the memory are further configured to reduce the rate of the measuring the one or more reference signals for the RLM procedure or the BFD procedure in response to the relaxation counter being within a counter threshold within an evaluation period.

Aspect 10 is the apparatus of any of aspects 1-9, further includes that the mobility criteria is based at least in part on a time average of at least one Doppler shift measurement of the one or more reference signals for the RLM procedure or the BFD procedure being less than a Doppler threshold.

Aspect 11 is the apparatus of any of aspects 1-10, further includes that the relaxation criteria is based at least in part on the rate of the measuring the one or more reference signals for the RLM procedure or the BFD procedure is less than a configured maximum measurement periodicity.

Aspect 12 is the apparatus of any of aspects 1-11, further includes that the at least one processor and the memory are further configured to receive, from a base station, an indication enabling a reduction of the rate of the measuring the one or more reference signals for the RLM procedure or the BFD procedure.

Aspect 13 is the apparatus of any of aspects 1-12, further includes that the indication comprises a relaxation configuration indicating a reduction of the rate of the measuring of the one or more reference signals based at least in part on a serving cell basis, for a SpCell only, or for all SCell only.

Aspect 14 is the apparatus of any of aspects 1-13, further includes that the at least one processor and the memory are further configured to receive, from a base station, a relaxation configuration comprising at least one scaling factor; and perform a reduced rate of measurement of the one or more reference signals with a periodicity based at least in part on the at least one scaling factor.

Aspect 15 is the apparatus of any of aspects 1-14, further includes that the at least one processor and the memory are further configured to exit a relaxation procedure after K measurement periods to re-evaluate the relaxation criteria based at least in part on a radio link quality of at least one of the one or more reference signals for the RLM procedure or the BFD procedure being less than an exit threshold.

Aspect 16 is the apparatus of any of aspects 1-15, further includes that the at least one processor and the memory are further configured to transmit, to a base station, a relaxation indication indicating that the UE has entered a relaxation procedure and has reduced the rate of the measuring of the one or more reference signals for the RLM procedure or the BFD procedure.

Aspect 17 is a method of wireless communication for implementing any of aspects 1-16.

Aspect 18 is an apparatus for wireless communication including means for implementing any of aspects 1-16.

Aspect 19 is a computer-readable medium storing computer executable code, where the code when executed by a processor causes the processor to implement any of aspects 1-16.

Aspect 20 is an apparatus for wireless communication at a base station including at least one processor coupled to a memory and configured to transmit, to a UE, a one or more reference signals for an RLM procedure or a BFD procedure; and transmit, to the UE, a relaxation configuration configuring the UE to reduce a rate of measuring the one or more reference signals for the RLM procedure or the BFD procedure in response to at least one measurement, by the UE, of the one or more reference signals meeting a relaxation criteria.

Aspect 21 is the apparatus of aspect 20, further including a transceiver coupled to the at least one processor.

Aspect 22 is the apparatus of any of aspects 20 and 21, further includes that the relaxation criteria comprises at least one of a mobility criteria or a distance criteria relative to a cell, wherein the mobility criteria is based at least in part on the UE having a stable radio link, low mobility, or being a stationary UE.

Aspect 23 is the apparatus of any of aspects 20-22, further includes that the distance criteria corresponds to the UE being remote from a cell edge based at least in part on at least one RRM measurement in a cell reselection procedure being greater than a first threshold.

Aspect 24 is the apparatus of any of aspects 20-23, further includes that the distance criteria corresponds to the UE being remote from a cell edge based at least in part on at least one L1-RSRP measurement of the one or more reference signals for the RLM procedure or the BFD procedure being greater than a second threshold, wherein the at least one L1-RSRP measurement comprises at least one filtered L1-RSRP measurement averaged over a time window.

Aspect 25 is the apparatus of any of aspects 20-24, further includes that the distance criteria corresponds to the UE being remote from a cell edge based at least in part on at least one L1-RSRP measurement of the one or more reference signals for the RLM procedure or the BFD procedure being greater than a third threshold, wherein a relaxation counter is incremented by one when the at least one L1-RSRP measurement is greater than the third threshold.

Aspect 26 is the apparatus of any of aspects 20-25, further includes that the relaxation criteria is based at least in part on the rate of the measuring the one or more reference signals for the RLM procedure or the BFD procedure is less than a configured maximum measurement periodicity.

Aspect 27 is the apparatus of any of aspects 20-26, further includes that the at least one processor and the memory are further configured to transmit, to the UE, an indication enabling a reduction of the rate of the measuring the one or more reference signals for the RLM procedure or the BFD procedure.

Aspect 28 is the apparatus of any of aspects 20-27, further includes that the indication comprises a relaxation configuration indicating a reduction of the rate of the measuring of the one or more reference signals based at least in part on a serving cell basis, for an SpCell only, or for all SCell only.

Aspect 29 is the apparatus of any of aspects 20-28, further includes that the at least one processor and the memory are further configured to transmit, to the UE, a relaxation configuration comprising at least one scaling factor, wherein the relaxation configuration configures the UE to reduce a rate of measurement of the one or more reference signals with a periodicity based at least in part on the at least one scaling factor.

Aspect 30 is the apparatus of any of aspects 20-29, further includes that the at least one processor and the memory are further configured to receive, from the UE, a relaxation indication indicating that the UE has entered a relaxation procedure and is reducing the rate of the measuring of the one or more reference signals for the RLM procedure or the BFD procedure.

Aspect 31 is a method of wireless communication for implementing any of aspects 20-30.

Aspect 32 is an apparatus for wireless communication including means for implementing any of aspects 20-30.

Aspect 33 is a computer-readable medium storing computer executable code, where the code when executed by a processor causes the processor to implement any of aspects 20-30.

What is claimed is:

1. An apparatus for wireless communication at a user equipment (UE), comprising:

memory; and one or more processors coupled to the memory and configured to cause the UE to:

measure one or more reference signals from a first cell for one or more of a radio link monitoring (RLM) procedure or a beam failure detection (BFD) procedure associated with the first cell;

receive an indication that causes the UE to:

enable the UE to enter a relaxation procedure associated with a relaxed measurement of the one or more reference signals for the one or more of the RLM procedure or the BFD procedure based, at least in part, on at least one measurement of the one or more reference signals that meets both a distance criterion relative to a cell edge of the first cell and a mobility criterion; and not enable the UE to enter the relaxation procedure based on the at least one measurement of the one or more reference signals that meets only one of the distance criterion relative to the cell edge of the first cell or the mobility criterion;

enter the relaxation procedure based at least in part on the at least one measurement of the one or more reference signals that meets both the mobility criterion and the distance criterion relative to the cell edge of the first cell, wherein the distance criterion is based at least in part on a radio link quality associated with the one or more reference signals for the one or more of the RLM procedure or the BFD procedure that is greater than a threshold; and transmit a relaxation indication to indicate that the UE has entered the relaxation procedure.

2. The apparatus of claim 1, wherein the mobility criterion is based at least in part on a stability of a radio link.

3. The apparatus of claim 1, wherein the distance criterion is further based at least in part on at least one radio resource management (RRM) measurement in a cell reselection procedure that is greater than a first threshold that indicates the UE is remote from the cell edge.

4. The apparatus of claim 1, wherein the radio link quality is associated with a layer 1 reference signal received power L1-RSRP measurement averaged over a time window.

5. The apparatus of claim 1, wherein, to enter the relaxation procedure, the one or more processors are further configured to cause the UE to:

increment a relaxation counter by one based on the radio link quality that is greater than the threshold; and enter the relaxation procedure in response to the relaxation counter that is within a counter threshold within an evaluation period.

6. The apparatus of claim 1, wherein the mobility criterion is based at least in part on a time average of at least one Doppler shift measurement of the one or more reference signals for the one or more of the RLM procedure or the BFD procedure that is less than a Doppler threshold.

7. The apparatus of claim 1, wherein an additional criterion is based at least in part on a current rate of measurement of the one or more reference signals for the one or more of the RLM procedure or the BFD procedure that is associated with a periodicity that is less than a configured maximum measurement periodicity.

8. The apparatus of claim 1, wherein the indication that enables the UE to enter the relaxation procedure indicates that the relaxation procedure applies on a serving cell basis, applies for a special cell (SpCell) only, or applies for all secondary cells (SCell) only.

9. The apparatus of claim 1, wherein the indication that enables the UE to enter the relaxation procedure is associated with at least one scaling factor, and wherein the relaxed measurement of the one or more reference signals for the one or more of the RLM procedure or the BFD procedure are associated with a periodicity based at least in part on the at least one scaling factor.

10. The apparatus of claim 1, further comprising a transceiver coupled to the one or more processors, wherein the one or more processors are further configured to cause the UE to:

exit the relaxation procedure after one or more measurement periods to re-evaluate the mobility criterion and the distance criterion based at least in part on the radio link quality associated with at least one of the one or more reference signals for the one or more of the RLM procedure or the BFD procedure that is less than an exit threshold.

11. The apparatus of claim 1, wherein, to enter the relaxation procedure, the one or more processors are configured to cause the UE to:

enter the relaxation procedure for the RLM procedure, wherein the relaxation indication indicates that the UE has entered the relaxation procedure for the RLM procedure.

12. The apparatus of claim 1, wherein, to enter the relaxation procedure, the one or more processors are configured to cause the UE to:

enter the relaxation procedure for the BFD procedure, wherein the relaxation indication indicates that the UE has entered the relaxation procedure for the BFD procedure.

13. A method of wireless communication at a user equipment (UE), comprising:

measuring one or more reference signals from a first cell for one or more of a radio link monitoring (RLM) procedure or a beam failure detection (BFD) procedure associated with the first cell;

receiving an indication that:

enables the UE to enter a relaxation procedure associated with a relaxed measurement of the one or more reference signals for the one or more of the RLM procedure or the BFD procedure based, at least in part, on at least one measurement of the one or more reference signals that meets both a distance criterion relative to a cell edge of the first cell and a mobility criterion; and does not enable the UE to enter the relaxation procedure based on the at least one measurement of the one or more reference signals that meets only one of the distance criterion relative to the cell edge of the first cell or the mobility criterion;

entering the relaxation procedure based at least in part on the at least one measurement of the one or more reference signals meeting both the mobility criterion and the distance criterion relative to the cell edge of the first cell, wherein the distance criterion is based at least in part on a radio link quality associated with the one or more reference signals for the one or more of the RLM procedure or the BFD procedure that is greater than a threshold; and transmitting a relaxation indication to indicate that the UE has entered the relaxation procedure.

14. The method of claim 13, wherein the mobility criterion is based at least in part on a stability of a radio link, a low mobility of the UE, or a stationary status of the UE.

15. The method of claim 13, wherein the distance criterion corresponds to the UE being remote from the cell edge further based at least in part on at least one radio resource management (RRM) measurement in a cell reselection procedure being greater than a first threshold.

16. The method of claim 13, wherein entering the relaxation procedure further comprises:

incrementing a relaxation counter by one based on the radio link quality that is greater than the threshold; and entering the relaxation procedure in response to the relaxation counter being within a counter threshold within an evaluation period.

17. The method of claim 13, wherein the indication that enables the UE to enter the relaxation procedure is associated with at least one scaling factor, and wherein the relaxed measurement of the one or more reference signals for the one or more of the RLM procedure or the BFD procedure are associated with a periodicity based at least in part on the at least one scaling factor.

18. The method of claim 13, further comprising:

exiting the relaxation procedure after one or more measurement periods to re-evaluate the mobility criterion and the distance criterion based at least in part on the radio link quality associated with at least one of the one or more reference signals for the one or more of the RLM procedure or the BFD procedure being less than an exit threshold.

19. The method of claim 13, wherein the radio link quality is associated with a layer 1 reference signal received power L1-RSRP measurement averaged over a time window.

20. The method of claim 13, wherein the mobility criterion is based at least in part on a time average of at least one Doppler shift measurement of the one or more reference signals for the one or more of the RLM procedure or the BFD procedure that is less than a Doppler threshold.

21. The method of claim 13, wherein an additional criterion is based at least in part on a current rate of measurement of the one or more reference signals for the one or more of the RLM procedure or the BFD procedure that is associated with a periodicity that is less than a configured maximum measurement periodicity.

22. The method of claim 13, wherein the indication that enables the UE to enter the relaxation procedure indicates that the relaxation procedure applies on a serving cell basis, applies for a special cell (SpCell) only, or applies for all secondary cells (SCell) only.

23. The method of claim 13, wherein entering the relaxation procedure comprises:

entering the relaxation procedure for the RLM procedure, wherein the relaxation indication indicates that the UE has entered the relaxation procedure for the RLM procedure.

24. The method of claim 13, wherein entering the relaxation procedure comprises:

entering the relaxation procedure for the BFD procedure, wherein the relaxation indication indicates that the UE has entered the relaxation procedure for the BFD procedure.

25. An apparatus for wireless communication at a base station, comprising:

memory; and one or more processors coupled to the memory and configured to cause the base station to:

transmit one or more reference signals associated with a first cell for one or more of a radio link monitoring (RLM) procedure or a beam failure detection (BFD) procedure associated with the first cell;

transmit, for a user equipment (UE), a relaxation configuration for the UE to enter a relaxation procedure associated with a relaxed measurement of the one or more reference signals for the one or more of the RLM procedure or the BFD procedure associated with the first cell in association with at least one measurement of the one or more reference signals that meets a plurality of relaxation criteria, wherein the plurality of relaxation criteria comprises a mobility criterion and a distance criterion relative to a cell edge of the first cell, wherein the distance criterion is based at least in part on a radio link quality associated with the one or more reference signals for the one or more of the RLM procedure or the BFD procedure that is greater than a threshold, wherein the relaxation configuration is configured to:

enable, at the UE, the relaxation procedure for the one or more reference signals for the one or more of the RLM procedure or the BFD procedure based, at least in part, on the at least one measurement of the one or more reference signals that meets both the distance criterion relative to the cell edge of the first cell and the mobility criterion; and not enable, at the UE, the relaxation procedure for the one or more reference signals based on the at least one measurement of the one or more reference signals that meets only one of the distance criterion relative to the cell edge of the first cell or the mobility criterion; and receive a relaxation indication that indicates that the UE has entered the relaxation procedure.

26. The apparatus of claim 25, wherein the mobility criterion is based at least in part on a stability of a radio link between the base station and the UE.

27. The apparatus of claim 25, wherein the distance criterion corresponds to a distance of the UE from the cell edge based at least in part on at least one radio resource management (RRM) measurement in a cell reselection procedure that is greater than a first threshold.

28. The apparatus of claim 25, wherein an additional criterion is based at least in part on a current rate of measurement of the one or more reference signals for the RLM procedure or the BFD procedure associated with a periodicity that is less than a configured maximum measurement periodicity.

29. The apparatus of claim 25, further comprising a transceiver coupled to the one or more processors, wherein the relaxation configuration indicates that the relaxation procedure applies on a serving cell basis, applies for a special cell (SpCell) only, or applies for all secondary cells (SCell) only.

30. The apparatus of claim 25, wherein the relaxation configuration is associated with at least one scaling factor, wherein the relaxation configuration configures the relaxed measurement of the one or more reference signals for the one or more of the RLM procedure or the BFD procedure to have a periodicity based at least in part on the at least one scaling factor.

31. The apparatus of claim 25, wherein, to transmit the relaxation configuration for the UE to enter the relaxation procedure for the one or more reference signals for the one or more of the RLM procedure or the BFD procedure associated with the first cell, the one or more processors are configured to cause the base station to:

transmit the relaxation configuration for the UE to enter the relaxation procedure for the one or more reference signals for the RLM procedure, wherein the relaxation indication indicates that the UE has entered the relaxation procedure for the one or more reference signals for the RLM procedure.

32. The apparatus of claim 25, wherein, to transmit the relaxation configuration for the UE to enter the relaxation procedure for the one or more reference signals for the one or more of the RLM procedure or the BFD procedure associated with the first cell, the one or more processors are configured to cause the base station to:

transmit the relaxation configuration for the UE to enter the relaxation procedure for the one or more reference signals for the BFD procedure, wherein the relaxation indication indicates that the UE has entered the relaxation procedure for the one or more reference signals for the BFD procedure.

33. A method of wireless communication at a base station, comprising:

transmitting one or more reference signals associated with a first cell for one or more of a radio link monitoring (RLM) procedure or a beam failure detection (BFD) procedure associated with the first cell;

transmitting, for a user equipment (UE), a relaxation configuration for the UE to enter a relaxation procedure associated with a relaxed measurement of the one or more reference signals for the one or more of the RLM procedure or the BFD procedure associated with the first cell in association with at least one measurement of the one or more reference signals meeting a plurality of relaxation criteria, wherein the plurality of relaxation criteria comprises a mobility criterion and a distance criterion relative to a cell edge of the first cell, wherein the distance criterion is based at least in part on a radio link quality associated with the one or more reference signals for the one or more of the RLM procedure or the BFD procedure that is greater than a threshold, wherein the relaxation configuration is configured to:

enable, at the UE, the relaxation procedure for the one or more reference signals for the one or more of the RLM procedure or the BFD procedure based, at least in part, on the at least one measurement of the one or more reference signals that meets both the distance criterion relative to the cell edge of the first cell and the mobility criterion; and not enable, at the UE, the relaxation procedure for the one or more reference signals based on the at least one measurement of the one or more reference signals that meets only one of the distance criterion relative to the cell edge of the first cell or the mobility criterion; and receiving a relaxation indication that indicates that the UE has entered the relaxation procedure.

34. The method of claim 33, wherein the distance criterion corresponds to a distance of the UE from the cell edge based at least in part on at least one radio resource management (RRM) measurement in a cell reselection procedure being greater than a first threshold.

35. The method of claim 33, wherein the relaxation configuration indicates that the relaxation procedure applies on a serving cell basis, applies for a special cell (SpCell) only, or applies for all secondary cells (SCell) only.

36. The method of claim 33, wherein the relaxation configuration is associated with at least one scaling factor, wherein the relaxation configuration configures the relaxed measurement of the one or more reference signals for the one or more of the RLM procedure or the BFD procedure to have a periodicity based at least in part on the at least one scaling factor.

37. The method of claim 33, wherein an additional criterion is based at least in part on a current rate of measurement of the one or more reference signals for the one or more of the RLM procedure or the BFD procedure associated with a periodicity that is less than a configured maximum measurement periodicity.

38. The method of claim 33, wherein transmitting the relaxation configuration for the UE to enter the relaxation procedure for the one or more reference signals for the one or more of the RLM procedure or the BFD procedure associated with the first cell comprises:

transmitting the relaxation configuration for the UE to enter the relaxation procedure for the one or more reference signals for the RLM procedure, wherein the relaxation indication indicates that the UE has entered the relaxation procedure for the one or more reference signals for the RLM procedure.

39. The method of claim 33, wherein transmitting the relaxation configuration for the UE to enter the relaxation procedure for the one or more reference signals for the one or more of the RLM procedure or the BFD procedure associated with the first cell comprises:

transmitting the relaxation configuration for the UE to enter the relaxation procedure for the one or more reference signals for the BFD procedure, wherein the relaxation indication indicates that the UE has entered the relaxation procedure for the one or more reference signals for the BFD procedure.

40. A non-transitory computer-readable storage medium storing computer executable code at a user equipment (UE), the code when executed by one or more processors causes the UE to:

measure one or more reference signals from a first cell for one or more of a radio link monitoring (RLM) procedure or a beam failure detection (BFD) procedure associated with the first cell;

receive an indication that causes the UE to:

enable the UE to enter a relaxation procedure associated with a relaxed measurement of the one or more reference signals for the one or more of the RLM procedure or the BFD procedure based, at least in part, on at least one measurement of the one or more reference signals that meets both a distance criterion relative to a cell edge of the first cell and a mobility criterion; and not enable the UE to enter the relaxation procedure based on the at least one measurement of the one or more reference signals that meets only one of the distance criterion relative to the cell edge of the first cell or the mobility criterion;

enter the relaxation procedure based at least in part on the at least one measurement of the one or more reference signals that meets both the mobility criterion and the distance criterion relative to the cell edge of the first cell, wherein the distance criterion is based at least in part on a radio link quality associated with the one or more reference signals for the one or more of the RLM procedure or the BFD procedure that is greater than a threshold; and transmit a relaxation indication to indicate that the UE has entered the relaxation procedure.

41. The non-transitory computer-readable storage medium of claim 40, wherein the indication that enables the UE to enter the relaxation procedure indicates that the relaxation procedure applies on a serving cell basis, applies for a special cell (SpCell) only, or applies for all secondary cells (SCell) only.

42. The non-transitory computer-readable storage medium of claim 40, wherein the mobility criterion is based at least in part on a stability of a radio link.

43. The non-transitory computer-readable storage medium of claim 40, wherein the distance criterion is further based at least in part on at least one radio resource management (RRM) measurement in a cell reselection procedure that is greater than a first threshold that indicates the UE is remote from the cell edge.

44. The non-transitory computer-readable storage medium of claim 40, wherein the indication that enables the UE to enter the relaxation procedure indicates that the relaxation procedure applies on a serving cell basis, applies for a special cell (SpCell) only, or applies for all secondary cells (SCell) only.

45. The non-transitory computer-readable storage medium of claim 40, wherein the indication that enables the UE to enter the relaxation procedure is associated with at least one scaling factor, and wherein the relaxed measurement of the one or more reference signals for the one or more of the RLM procedure or the BFD procedure are associated with a periodicity based at least in part on the at least one scaling factor.

46. The non-transitory computer-readable storage medium of claim 40, wherein the code when executed by the one or more processors causes the UE to:

exit the relaxation procedure after one or more measurement periods to re-evaluate the mobility criterion and the distance criterion based at least in part on the radio link quality associated with at least one of the one or more reference signals for the one or more of the RLM procedure or the BFD procedure that is less than an exit threshold.

47. The non-transitory computer-readable storage medium of claim 40, wherein, to enter the relaxation procedure, the code when executed by the one or more processors causes the UE to:

enter the relaxation procedure for the RLM procedure, wherein the relaxation indication indicates that the UE has entered the relaxation procedure for the RLM procedure.

48. The non-transitory computer-readable storage medium of claim 40, wherein, to enter the relaxation procedure, the code when executed by the one or more processors causes the UE to:

enter the relaxation procedure for the BFD procedure, wherein the relaxation indication indicates that the UE has entered the relaxation procedure for the BFD procedure.

49. A non-transitory computer-readable storage medium storing computer executable code at a base station, the code when executed by one or more processors causes the base station to:

transmit one or more reference signals associated with a first cell for one or more of a radio link monitoring (RLM) procedure or a beam failure detection (BFD) procedure associated with the first cell;

transmit, for a user equipment (UE), a relaxation configuration for the UE to enter a relaxation procedure associated with a relaxed measurement of the one or more reference signals for the one or more of the RLM procedure or the BFD procedure associated with the first cell in association with at least one measurement of the one or more reference signals that meets a plurality of relaxation criteria, wherein the plurality of relaxation criteria comprises a mobility criterion and a distance criterion relative to a cell edge of the first cell, wherein the distance criterion is based at least in part on a radio link quality associated with the one or more reference signals for the one or more of the RLM procedure or the BFD procedure that is greater than a threshold, wherein the relaxation configuration is configured to:

enable, at the UE, the relaxation procedure for the one or more reference signals for the one or more of the RLM procedure or the BFD procedure based, at least in part, on the at least one measurement of the one or more reference signals that meets both the distance criterion relative to the cell edge of the first cell and the mobility criterion; and not enable, at the UE, the relaxation procedure for the one or more reference signals based on the at least one measurement of the one or more reference signals that meets only one of the distance criterion relative to the cell edge of the first cell or the mobility criterion; and receive a relaxation indication that indicates that the UE has entered the relaxation procedure.

50. The non-transitory computer-readable storage medium of claim 49, wherein the relaxation configuration indicates that the relaxation procedure applies on a serving cell basis, applies for a special cell (SpCell) only, or applies for all secondary cells (SCell) only.

51. The non-transitory computer-readable storage medium of claim 49, wherein the relaxation configuration is associated with at least one scaling factor, wherein the relaxation configuration configures the relaxed measurement of the one or more reference signals to have a periodicity based at least in part on the at least one scaling factor.

52. The non-transitory computer-readable storage medium of claim 49, wherein, to transmit the relaxation configuration for the UE to enter the relaxation procedure for the one or more reference signals for the one or more of the RLM procedure or the BFD procedure associated with the first cell, the code when executed by the one or more processors causes the base station to:

transmit the relaxation configuration for the UE to enter the relaxation procedure for the one or more reference signals for the RLM procedure, wherein the relaxation indication indicates that the UE has entered the relaxation procedure for the one or more reference signals for the RLM procedure.

53. The non-transitory computer-readable storage medium of claim 49, wherein, to transmit the relaxation configuration for the UE to enter the relaxation procedure for the one or more reference signals for the one or more of the RLM procedure or the BFD procedure associated with the first cell, the code when executed by the one or more processors causes the base station to:

transmit the relaxation configuration for the UE to enter the relaxation procedure for the one or more reference signals for the BFD procedure, wherein the relaxation indication indicates that the UE has entered the relaxation procedure for the one or more reference signals for the BFD procedure.

* * * * *